United States Patent
Yoneta et al.

(10) Patent No.: US 8,849,474 B2
(45) Date of Patent: Sep. 30, 2014

(54) RIDER CHARACTERISTIC DETERMINING APPARATUS, AND A SADDLE RIDING TYPE VEHICLE HAVING THE SAME

(75) Inventors: Keisuke Yoneta, Shizuoka (JP); Hiroshi Daimoto, Shizuoka (JP); Atsuo Yamamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/518,444

(22) PCT Filed: Nov. 22, 2010

(86) PCT No.: PCT/JP2010/006830
§ 371 (c)(1),
(2), (4) Date: Jun. 22, 2012

(87) PCT Pub. No.: WO2011/077638
PCT Pub. Date: Jun. 30, 2011

(65) Prior Publication Data
US 2012/0259479 A1 Oct. 11, 2012

(30) Foreign Application Priority Data
Dec. 25, 2009 (JP) ................................. 2009-295389

(51) Int. Cl.
| G06F 7/00 | (2006.01) |
| G05D 1/00 | (2006.01) |
| G06F 17/00 | (2006.01) |
| B62J 27/00 | (2006.01) |
| B62H 7/00 | (2006.01) |
| B62J 99/00 | (2009.01) |

(52) U.S. Cl.
CPC .............. B62H 7/00 (2013.01); *B62K 2207/04* (2013.01); *B62J 2099/0013* (2013.01); B62J 27/00 (2013.01); *B62K 2207/02* (2013.01); *B62J 99/00* (2013.01)
USPC ....................... 701/1; 701/36; 434/65; 434/66

(58) Field of Classification Search
CPC ........... G06F 7/00; G06F 19/00; G06F 11/30; G06F 15/16; B60T 8/172; B60T 8/1708; B60T 7/22; B60T 7/20; B60W 10/10; B60W 40/09; B60W 30/04

USPC ............ 701/29, 45, 70, 44, 1, 38, 37, 71, 41, 701/216, 62, 214, 36; 434/65, 66; 180/223, 180/37

See application file for complete search history.

(56) References Cited

U.S. PATENT DOCUMENTS 7,769,512 B2 * 8/2010 Norris et al. ..................... 701/44
8,260,505 B2 * 9/2012 Peeters et al. ................... 701/49

(Continued)

FOREIGN PATENT DOCUMENTS

| EP | 1 679 673 A1 | 7/2006 | |
| GB | 2383309 A * | 6/2003 | ............. B62K 25/28 |

(Continued)

OTHER PUBLICATIONS

Official Communication issued in International Patent Application No. PCT/JP2010/006830, mailed on Mar. 8, 2011.

(Continued)

*Primary Examiner* — Calvin Cheung
*Assistant Examiner* — Luis A Martinez Borrero
(74) *Attorney, Agent, or Firm* — Keating & Bennett, LLP

(57) ABSTRACT

A rider characteristic determining apparatus capable of determining characteristics of a rider controlling a saddle riding type vehicle, and a saddle riding type vehicle including the same, are configured such that the rider's characteristics are determined from a turning movement of the saddle riding type vehicle which reflects results of the rider controlling the saddle riding type vehicle. This enables a stable characteristic determination regardless of individual operation or control by the rider. Further, a turning performance score of the vehicle is calculated based on at least one of vehicle state amounts of a roll direction, a pitch direction and a caster angle which influence the steering angle of the saddle riding type vehicle. This enables a proper evaluation of the turning characteristic of the saddle riding type vehicle.

17 Claims, 22 Drawing Sheets

(56) References Cited

U.S. PATENT DOCUMENTS

| | | | |
|---|---|---|---|
| 2004/0181329 A1* | 9/2004 | Tseng et al. | 701/38 |
| 2005/0197994 A1* | 9/2005 | Fujii et al. | 706/59 |
| 2005/0212254 A1* | 9/2005 | Heitner | 280/298 |
| 2006/0064213 A1* | 3/2006 | Lu et al. | 701/37 |
| 2007/0017727 A1* | 1/2007 | Messih et al. | 180/282 |
| 2007/0102217 A1* | 5/2007 | Kimura | 180/223 |
| 2008/0059021 A1* | 3/2008 | Lu et al. | 701/36 |
| 2008/0059034 A1* | 3/2008 | Lu | 701/71 |
| 2008/0082246 A1* | 4/2008 | Brown et al. | 701/91 |
| 2008/0086248 A1* | 4/2008 | Lu et al. | 701/41 |
| 2008/0086251 A1* | 4/2008 | Lu et al. | 701/70 |
| 2008/0184770 A1 | 8/2008 | Sato | |
| 2008/0195281 A1* | 8/2008 | Norris et al. | 701/44 |
| 2008/0294342 A1* | 11/2008 | Hoshizaki et al. | 701/216 |
| 2009/0005943 A1* | 1/2009 | Oshima et al. | 701/62 |
| 2009/0018772 A1* | 1/2009 | Watanabe et al. | 701/214 |
| 2009/0088918 A1* | 4/2009 | Takenaka et al. | 701/29 |
| 2009/0103319 A1* | 4/2009 | Peeters et al. | 362/465 |
| 2009/0222164 A1* | 9/2009 | Seiniger et al. | 701/36 |
| 2010/0017066 A1* | 1/2010 | Lu et al. | 701/45 |
| 2010/0023235 A1* | 1/2010 | Kremer et al. | 701/70 |
| 2010/0076649 A1* | 3/2010 | Iyoda et al. | 701/38 |
| 2010/0168958 A1* | 7/2010 | Baino | 701/36 |
| 2010/0209889 A1* | 8/2010 | Huang et al. | 434/65 |
| 2010/0211270 A1* | 8/2010 | Chin et al. | 701/44 |
| 2011/0029198 A1* | 2/2011 | Mizuta et al. | 701/38 |
| 2011/0153156 A1* | 6/2011 | Haller et al. | 701/36 |
| 2012/0173039 A1* | 7/2012 | Yokota | 701/1 |

FOREIGN PATENT DOCUMENTS

| | | |
|---|---|---|
| JP | 5-246370 A | 9/1993 |
| JP | 3516986 B2 | 2/1995 |
| JP | 8-150914 A | 6/1996 |
| JP | 2004-338507 A | 12/2004 |
| JP | 2005-310114 A | 11/2005 |
| JP | 2006-44528 A | 2/2006 |
| JP | 2006-151280 A | 6/2006 |
| JP | 2006-232172 A | 9/2006 |
| JP | 2009-219633 A | 10/2009 |
| WO | 2005/038746 A1 | 4/2005 |

OTHER PUBLICATIONS

Official Communication issued in corresponding European Patent Application No. 10838878.6, mailed on Jun. 5, 2013.
Kooijman et al., "Experimental validation of a model of an uncontrolled bicycle", Multibody System Dynamics, Kluwer Academic Publishers, May 5, 2007, vol. 19, No. 1-2, pp. 115-132.
Pacejka, "Motorcycle Dynamics" In "Tyre and Vehicle Dynamics", Butterworth-Heinemann, Dec. 31, 2002, Woburn, Massachusetts, pp. 511-521.

* cited by examiner

| vehicle stability score | turning performance score | head stability score | classified characteristic No. |
|---|---|---|---|
| low | low | low | characteristic 1 |
| | | middle | characteristic 2 |
| | | high | characteristic 3 |
| | middle | low | characteristic 4 |
| | | middle | characteristic 5 |
| | | high | characteristic 6 |
| | high | low | characteristic 7 |
| | | middle | characteristic 8 |
| | | high | characteristic 9 |
| middle | low | low | characteristic 10 |
| | | middle | characteristic 11 |
| | | high | characteristic 12 |
| | middle | low | characteristic 13 |
| | | middle | characteristic 14 |
| | | high | characteristic 15 |
| | high | low | characteristic 16 |
| | | middle | characteristic 17 |
| | | high | characteristic 18 |
| high | 低 | low | characteristic 19 |
| | | middle | characteristic 20 |
| | | high | characteristic 21 |
| | middle | low | characteristic 22 |
| | | middle | characteristic 23 |
| | | high | characteristic 24 |
| | high | low | characteristic 25 |
| | | middle | characteristic 26 |
| | | high | characteristic 27 |

RIDER CHARACTERISTIC DETERMINING APPARATUS, AND A SADDLE RIDING TYPE VEHICLE HAVING THE SAME

BACKGROUND OF THE INVENTION

1. Field of the Invention

The present invention relates to a rider characteristic determining apparatus for determining characteristics of a rider controlling a saddle riding type vehicle, and to a saddle riding type vehicle including such a rider characteristic determining apparatus.

2. Description of the Related Art

Conventionally, a characteristic determining apparatus for an operator who controls a vehicle has been intended for the driver of a four-wheeled vehicle. As a characteristic determining technique for the driver of a four-wheeled vehicle, there is a characteristic determination that provides scores based on variations of a steering angle over time. With four-wheeled vehicles, a steering angle is governed by a steering control amount by the driver, and therefore a characteristic determination of the driver is carried out using only steering angles.

The characteristic determining apparatus described in Japanese Unexamined Patent Publication No. 2006-232172 detects a steering control amount of the driver, and detects which of three types of steering states, i.e. aright steering, a left steering, and a steering angle maintenance, from predicted steering components of steering along a curve. A driving support apparatus for a vehicle is disclosed, which determines a steering characteristic of steering of the driver from the number of detected steering states, and changes control of the vehicle in response to the determined steering characteristic.

The characteristic determining apparatus described in Japanese Patent No. 3269296 detects a steering control, a vehicle speed, and a yaw rate of the vehicle, and determines a vehicles position recovering characteristic derived from a correlation between a front and rear wheel speed difference and a reverse steering angle corresponding to counter steer, a curve negotiating characteristic derived from a correlation between the yaw rate and a maximum steering angle during a turn, and a high speed run accommodating characteristic derived from a correlation between the vehicle speed and maximum steering angle. A driving characteristic detecting apparatus and a vehicle motion control apparatus are disclosed, which change controls of the vehicle according to the determined characteristics.

In the characteristic determining apparatus described in Japanese Patent No. 3516986, a driving skill estimating apparatus is disclosed, which detects a steering angle, a vehicle speed, a yaw rate, a throttle operation and a brake operation, derives a target track and an actual tack of the vehicle from the detected values, and determines a driving skill based on a difference therebetween.

However, the techniques described in Japanese Unexamined Patent Publication No. 2006-232172, Japanese Patent No. 3269296 and Japanese Patent No. 3516986 assume that the steering angle of the vehicle is influenced only by steering control. Therefore, control characteristics cannot be evaluated properly for a saddle riding type vehicle having a steering angle that is greatly influenced by other directions of rotation angle besides steering control.

Thus, the techniques described in Japanese Unexamined Patent Publication No. 2006-232172, Japanese Patent No. 3269296, and Japanese Patent No. 3516986 are premised on the steering angle of the vehicle being influenced only by the steering angle. This is because the above patent documents are directed mainly to the driver of a four-wheeled vehicle, and it can be considered that the vehicle steering angle in the four-wheeled vehicle is substantially governed by steering control of the driver.

SUMMARY OF THE INVENTION

In view of the state of the art noted above, preferred embodiments of the present invention provide a rider characteristic determining apparatus, and a saddle riding type vehicle including such a rider characteristic determining apparatus, which can determine, with high accuracy, control characteristics of a rider who controls the saddle riding type vehicle.

A rider characteristic determining apparatus according to a preferred embodiment of the present invention is a rider characteristic determining apparatus for determining control characteristics of a rider controlling a saddle riding type vehicle, including a first vehicle state detector that detects at least one of a yaw rate and a yaw angle of the saddle riding type vehicle; a turning movement discriminating unit that discriminates a section where the saddle riding type vehicle has made a turning movement; a second vehicle state detector that detects at least one of a roll rate, a roll angle, a pitch rate, a pitch angle and a caster angle of the saddle riding type vehicle; a component separating unit that separates detection values detected by the first vehicle state detector and the second vehicle state detector in the turning movement section discriminated by the turning movement discriminating unit, into adjustment components which are high-frequency band components higher than a threshold frequency set beforehand, and prediction components which are low-frequency band components lower than the threshold frequency; a vehicle stability characteristic determining unit that determines a vehicle stability characteristic of the saddle riding type vehicle; and a turning characteristic determining unit that determines a turning characteristic of the saddle riding type vehicle; wherein the vehicle stability characteristic determining unit includes a vehicle stability score calculating unit that calculates a vehicle stability score of the saddle riding type vehicle based on a ratio between the adjustment components and the prediction components separated from the detection value of the first vehicle state detector by the component separating unit; and the turning characteristic determining unit includes a turning performance score calculating unit that calculates a turning performance score of the saddle riding type vehicle based on the prediction components separated from the detection value of the second vehicle state detector by the component separating unit.

The rider characteristic determining apparatus according to a preferred embodiment of the present invention, with the first vehicle state detector that detects at least one of the yaw rate and the yaw angle of the saddle riding type vehicle, detects data of an angle or angular speed in a yaw direction of the saddle riding type vehicle. The turning movement discriminating unit discriminates a turning movement section where the saddle riding type vehicle has made a turning movement. The rider characteristic determining apparatus, with the second vehicle state detector which detects at least one of the roll rate, roll angle, pitch rate, pitch angle and caster angle of the saddle riding type vehicle, detects a vehicle state amount in the roll direction, in the pitch direction or the caster angle of the saddle riding type vehicle.

The component separating unit separates detection values detected by the first vehicle state detector and the second vehicle state detector into adjustment components, which are high-frequency band components higher than a threshold frequency set beforehand, and prediction components, which are low-frequency band components lower than the threshold frequency. The vehicle stability characteristic determining unit determines a vehicle stability characteristic of the saddle riding type vehicle. Further, the vehicle stability characteristic determining unit includes a vehicle stability score calculating unit that calculates a vehicle stability score of the saddle riding type vehicle based on a ratio between the adjustment components and the prediction components separated from the detection value of the first vehicle state detector by the component separating unit. The turning characteristic determining unit determines a turning characteristic of the saddle riding type vehicle. Further, the turning characteristic determining unit includes a turning performance score calculating unit that calculates a turning performance score of the saddle riding type vehicle based on the prediction components separated from the detection value of the second vehicle state detector by the component separating unit.

Thus, since the rider's control characteristics are determined from a turning movement of the saddle riding type vehicle, which reflects results of the rider controlling the saddle riding type vehicle, a stable characteristic determination can be made for any rider. Further, since a stability of the vehicle is calculated based on a vehicle state amount in the yaw direction reflecting variations in the steering angle of the saddle riding type vehicle, the vehicle stability in the turning movement of the saddle riding type vehicle can be evaluated properly.

The vehicle state amount detected by the first vehicle state detector is separated into adjustment components and the prediction components by the threshold frequency, and the vehicle stability score is calculated from the ratio therebetween. This can evaluate vehicle stability without regard to the size of turning of the vehicle.

Further, a turning performance score of the vehicle is calculated based on at least one of the vehicle state amounts of a roll direction, a pitch direction and a caster angle which influence the steering angle of the saddle riding type vehicle. This enables a proper evaluation of the turning characteristic of the saddle riding type vehicle. The vehicle state amount detected by the second vehicle state detector is separated into adjustment components and prediction components by the threshold frequency, and the turning performance score of the turning vehicle is calculated based on the prediction components. This can evaluate the turning performance of the vehicle properly.

The rider's control characteristics can be determined quantitatively by calculating the vehicle stability score and the turning performance score as described above. Since the rider's control characteristics are determined based on the two criteria of vehicle stability and turning performance, an erroneous determination of the characteristics can be prevented and the rider's characteristics can be determined with high accuracy.

In a preferred embodiment of the present invention, it is preferred that the turning movement discriminating unit discriminates the section where the saddle riding type vehicle has made the turning movement based on at least one of the yaw rate, the yaw angle, the roll rate, the roll angle, a steering angle and a GPS track, for example, so as to accurately discriminate the turning movement section.

In a preferred embodiment of the present invention, it is preferred that the vehicle stability characteristic determining unit includes a vehicle stability score comparing unit that determines the vehicle stability characteristic by comparing the vehicle stability score with a criterion value of the vehicle stability characteristic; and that the turning characteristic determining unit includes a turning performance score comparing unit that determines the turning characteristic by comparing the turning performance score with a criterion value of the turning characteristic.

The vehicle stability characteristic determining unit preferably includes a vehicle stability score comparing unit. The vehicle stability score comparing unit determines the stability characteristic of the saddle riding type vehicle by comparing the vehicle stability score with a criterion value of the vehicle stability characteristic. The turning characteristic determining unit includes a turning performance score comparing unit. The turning performance score comparing unit determines the turning characteristic by comparing the turning performance score with a criterion value of the turning characteristic. Consequently, by comparing the vehicle stability score and the turning performance score with each criterion value, the rider's control characteristics for the vehicle stability and turning performance can be ranked.

In a preferred embodiment of the present invention, it is preferred that the vehicle stability score calculating unit calculates the vehicle stability score based on a ratio between the adjustment components and the prediction components separated from the detection values of the first vehicle state detector and the second vehicle state detector by the component separating unit.

The vehicle stability score calculating unit calculates the vehicle stability score based on a ratio between the adjustment components and the prediction components separated from the detection values of the first vehicle state detector and the second vehicle state detector by the component separating unit. In addition to the vehicle state amount in the yaw direction showing variations of the steering angle, at least one vehicle state amount in the roll direction or pitch direction or of the caster angle is separated into adjustment components and prediction components. The vehicle stability score is calculated based on the ratios thereof with increased accuracy.

Thus, for determination of the stability characteristic, in addition to the vehicle state amount in the yaw direction which influences the steering angle of the saddle riding type vehicle, at least one vehicle state amount in the roll direction or pitch direction or of the caster angle is separated into adjustment components and prediction components, and the determination is made based on the ratios thereof. Therefore, the vehicle stability characteristic of the saddle riding type vehicle can be determined with increased accuracy.

In a preferred embodiment of the present invention, it is preferred that the apparatus includes a steering angle sensor that detects a steering angle; wherein the component separating unit separates into the adjustment components and the prediction components a detection value detected by the steering angle sensor in the turning movement section discriminated by the turning movement discriminating unit; and the turning performance score calculating unit calculates the turning performance score based on the prediction components separated from the detection values of the second vehicle state detector and the steering angle sensor by the component separating unit.

Thus, the rider characteristic determining apparatus, which includes the steering angle sensor, can detect a steering angle. The detected steering angle is separated by the component separating unit into adjustment components and prediction components. The turning performance score calculating unit calculates the turning performance score of the turning vehicle based on the detection values of the second vehicle state detector and the steering angle sensor such that the turning characteristic can be determined with increased accuracy.

In a preferred embodiment of the present invention, it is preferred that the apparatus includes a vehicle speed sensor that detects a vehicle speed of the saddle riding type vehicle; wherein the turning performance score calculating unit calculates the turning performance score based on the prediction components separated from the detection value of the second vehicle state detector by the component separating unit and the vehicle speed detected by the vehicle speed sensor.

Thus, the rider characteristic determining apparatus, which includes the vehicle speed sensor, can detect a vehicle speed. The turning performance score calculating unit calculates the turning performance score of the turning vehicle based on the prediction components of the detection value detected by the second vehicle state detector and the vehicle speed detected by the vehicle speed sensor. By using the vehicle speed as an element to determine the turning characteristic, the vehicle speed can be reflected in determining the turning characteristic such that the turning characteristic can be determined with increased accuracy.

In a preferred embodiment of the present invention, it is preferred that the apparatus includes a curve size estimating unit that estimates a curvature size of a curve run by the saddle riding type vehicle; wherein the vehicle stability characteristic determining unit includes a first curve size correcting unit that corrects the vehicle stability score according to the curvature size of the curve; and the turning characteristic determining unit includes a second curve size correcting unit that corrects the turning performance score according to the curvature size of the curve.

The curve size estimating unit estimates the curvature size of a curve run by the saddle riding type vehicle. The first curve size correcting unit included in the vehicle stability characteristic determining unit corrects the vehicle stability score according to the estimated curvature size of the curve. The second curve size correcting unit included in the turning characteristic determining unit corrects the turning performance score according to the estimated curvature size of the curve. The vehicle stability score and turning performance score corrected according to the estimated curvature size of the curve enable determination of the rider's characteristics with a reduced influence of the curvature size. Even with vehicle stability scores and turning performance scores calculated for curves of different curvatures, a comparison can be made between the scores calculated for the respective curves.

In a preferred embodiment of the present invention, it is preferred that the apparatus includes a traveling surface condition estimating unit that estimates a traveling surface condition run by the saddle riding type vehicle; wherein the vehicle stability characteristic determining unit includes a first traveling surface condition correcting unit that corrects the vehicle stability score according to the traveling surface condition estimated; and the turning characteristic determining unit includes a second traveling surface condition correcting unit that corrects the turning performance score according to the traveling surface condition estimated.

The traveling surface condition estimating unit estimates the traveling surface condition run by the saddle riding type vehicle. The first traveling surface condition correcting unit included in the vehicle stability characteristic determining unit corrects the vehicle stability score according to the estimated traveling surface condition. The second traveling surface condition correcting unit included in the turning characteristic determining unit corrects the turning performance score according to the estimated traveling surface condition. The vehicle stability score and turning performance score corrected according to the estimated traveling surface condition enable determination of the rider's characteristics with a reduced influence of the traveling surface condition. Even with vehicle stability scores and turning performance scores calculated for different traveling surface conditions, a comparison can be made between the scores calculated for the respective traveling surface conditions.

In a preferred embodiment of the present invention, it is preferred that the apparatus includes an overall characteristic determining unit that determines the rider's comprehensive overall characteristics based on the vehicle stability score and the vehicle turning performance score.

The overall characteristic determining unit determines the rider's comprehensive overall characteristics based on the vehicle stability score and the vehicle turning performance score, which are the two types of scores having different criteria. Since the rider's characteristics determined by the plurality of criteria are evaluated based on one unified criterion, comparison of characteristics can easily be made between different individuals or with respect to the same individual.

In a preferred embodiment of the present invention, it is preferred that the apparatus includes a database that accumulates past and present vehicle stability scores and turning performance scores; and a characteristic transition calculating unit that derives a transition of the rider's control characteristics using information in the database.

The past and present vehicle stability scores and turning performance scores are accumulated in the database. The characteristic transition calculating unit derives a transition of the rider's control characteristics using the information accumulated in the database. By deriving a transition of the rider's control characteristics using the information of the past, not only the characteristic information of the present, variations in the rider's characteristics from the past to the present can be known.

In a preferred embodiment of the present invention, it is preferred that the apparatus includes a characteristic classifying unit for classifying the rider's control characteristics into one of a plurality of categories set beforehand, based on the vehicle stability score and the turning performance score.

The characteristic classifying unit classifies the rider's control characteristics into a plurality of categories set beforehand, based on the vehicle stability score and the turning performance score. This allows the rider to know an inclination of his control characteristics.

In a preferred embodiment of the present invention, it is preferred that the apparatus includes a rider movement detector that detects at least one of a pitch rate, a pitch angle, a yaw rate and a yaw angle of the rider's head or eyeball; and a head stability characteristic determining unit that determines the rider's head stability characteristic; wherein the component separating unit separates a detection value detected by the rider movement detector in the turning movement section discriminated by the turning movement discriminating unit, into adjustment components and prediction components; and the head stability characteristic determining unit includes a head stability score calculating unit that calculates a head stability score of the rider based on a ratio between the adjustment components and the prediction components separated from the detection value of the rider movement detector by the component separating unit.

The rider characteristic determining apparatus, which includes the rider movement detector, can detect at least one of a pitch rate, a pitch angle, a yaw rate and a yaw angle of the rider's head or eyeball. The component separating unit separates the detection value detected by the rider movement detector in the turning movement section discriminated by the turning movement discriminating unit, into adjustment components and prediction components. The head stability characteristic determining unit determines the rider's head stability characteristic. Further, the head stability characteristic determining unit includes a head stability score calculating unit that calculates a head stability score of the rider based on a ratio between the adjustment components and the prediction components separated from the detection value of the rider movement detector by the component separating unit.

By determining the rider's head stability characteristic, whether the rider's head is stable to be able to grasp the surrounding situation also can be made a criterion for characteristic determination. By determining the head stability characteristic in addition to the vehicle stability characteristic and the turning characteristic, an erroneous determination can be prevented and the rider's control characteristics can be determined with high accuracy. Thus, by calculating the head stability score in addition to the vehicle stability score and the turning performance score, the rider's control characteristics can be determined quantitatively with increased accuracy.

In a preferred embodiment of the present invention, it is preferred that the head stability characteristic determining unit includes a head stability score comparing unit that compares the head stability score with a criterion value of the head stability characteristic, to determine the head stability characteristic of the rider.

The head stability characteristic determining unit includes a head stability score comparing unit. The head stability score comparing unit compares the head stability score with a criterion value of the head stability characteristic, to determine the head stability characteristic of the rider. Thus, by comparing the head stability score with the criterion value of the head stability characteristic, the rider's control characteristics for the head stability can be ranked.

In a preferred embodiment of the present invention, it is preferred that the apparatus includes an overall characteristic determining unit that determines the rider's comprehensive overall characteristic based on at least two of the vehicle stability score, the vehicle turning performance score and the head stability score.

The overall characteristic determining unit determines the rider's comprehensive overall characteristic based on at least two of the vehicle stability score, the vehicle turning performance score and the head stability score. Since the rider's characteristics determined by the plurality of criteria are evaluated based on one unified criterion, comparison of characteristics can easily be done between different individuals or with respect to the same individual.

In a preferred embodiment of the present invention, it is preferred that the apparatus includes a database that accumulates past and present vehicle stability scores, turning performance scores and head stability scores; and a characteristic transition calculating unit that calculates a transition of the rider's control characteristics using information in the database.

Past and present vehicle stability scores, turning performance scores and head stability scores are accumulated in the database. The characteristic transition calculating unit derives a transition of the rider's control characteristics using the information accumulated in the database. By deriving a transition of the rider's control characteristics using the information of the past, not only the characteristic information of the present, variations in the rider's characteristics from the past to the present can be known.

In a preferred embodiment of the present invention, it is preferred that the apparatus includes a characteristic classifying unit that classifies the rider's control characteristics into one of a plurality of categories set beforehand, based on at least two of the vehicle stability score, the turning performance score and the head stability score.

The characteristic classifying unit classifies the rider's control characteristics into a plurality of categories set beforehand, based on at least two of the vehicle stability score, the turning performance score and the head stability score. This allows the rider to know an inclination of his control characteristics.

A preferred embodiment of the present invention also provides a saddle riding type vehicle including a rider characteristic determining apparatus according to any one of the preferred embodiments of the present invention described above. With the saddle riding type vehicle according to a preferred embodiment of the present invention, the rider's control characteristics can be determined conveniently.

The present invention is not limited to the foregoing preferred embodiments, but may include additional constructions by further adding the following constituent elements described below.

In a preferred embodiment of the present invention, it is preferred that the apparatus includes a progress level classifying unit that classifies a level of progress of the rider's control characteristics into one of a plurality of categories set beforehand, based on results of calculation by the characteristic transition calculating unit.

In a preferred embodiment of the present invention, it is preferred that the apparatus includes a characteristic presenter that presents at least one of determination results of the vehicle stability characteristic determining unit and the turning characteristic determining unit to at least one of the rider's sensory organs of vision, hearing and touch.

The characteristic presenter presents at least one of the determination results of the vehicle stability characteristic determining unit and the turning characteristic determining unit to at least one of the rider's sensory organs of vision, hearing and touch. Since each determination result can be presented to the rider, the rider's control characteristics become clear, and information leading to improvement in control skills can be provided for the rider.

In a preferred embodiment of the present invention, it is preferred that the apparatus includes a characteristic presenter that presents at least one of determination results of the vehicle stability characteristic determining unit, the turning characteristic determining unit and the head stability characteristic determining unit to at least one of the rider's sensory organs of vision, hearing and touch.

In a preferred embodiment of the present invention, it is preferred that the apparatus includes a characteristic presenter that presents at least one of determination results of the vehicle stability characteristic determining unit, the turning characteristic determining unit and the overall characteristic determining unit to at least one of the rider's sensory organs of vision, hearing and touch. It is also preferred that the apparatus includes a characteristic presenter that presents at least one of determination results of the vehicle stability characteristic determining unit, the turning characteristic determining unit, the head stability characteristic determining unit and the overall characteristic determining unit to at least one of the rider's sensory organs of vision, hearing and touch.

In a preferred embodiment of the present invention, it is preferred that the apparatus includes a characteristic presenter that presents at least one of determination results or classification result of the vehicle stability characteristic determining unit, the turning characteristic determining unit and the characteristic classifying unit to at least one of the rider's sensory organs of vision, hearing and touch. It is also preferred that the apparatus includes a characteristic presenter that presents at least one of determination results or classification result of the vehicle stability characteristic determining unit, the turning characteristic determining unit, the head stability characteristic determining unit and the characteristic classifying unit to at least one of the rider's sensory organs of vision, hearing and touch.

In a preferred embodiment of the present invention, it is preferred that the apparatus includes a characteristic presenter that presents at least one of determination results or classification result of the vehicle stability characteristic determining unit, the turning characteristic determining unit and the progress level classifying unit to at least one of the rider's sensory organs of vision, hearing and touch. It is also preferred that the apparatus includes a characteristic presenter that presents at least one of determination results or classification result of the vehicle stability characteristic determining unit, the turning characteristic determining unit, the head stability characteristic determining unit and the progress level classifying unit to at least one of the rider's sensory organs of vision, hearing and touch.

In a preferred embodiment of the present invention, it is preferred that the head stability characteristic determining unit includes a third curve size correcting unit that corrects the head stability score according to the curvature size of the curve.

In a preferred embodiment of the present invention, it is preferred that the head stability characteristic determining unit includes a third traveling surface condition correcting unit that corrects the vehicle stability score according to the traveling surface condition estimated.

Here, the "saddle riding type vehicle" includes, besides a vehicle on which the rider can mount in a state of straddling a saddle-like object, a scooter type vehicle on which the rider can mount with the legs close together, for example.

The rider characteristic determining apparatus according to a preferred embodiment of the present invention determines the rider's characteristic based on the turning movement of the saddle riding type vehicle occurring as a result of the rider controlling the saddle riding type vehicle. Therefore, a stable characteristic determination can be made regardless of individual operations or controls of the rider. Further, since the vehicle stability score is calculated based on the vehicle state amount in the yaw direction reflecting variations in the steering angle of the saddle riding type vehicle, the vehicle stability in the turning movement of the saddle riding type vehicle can be evaluated properly. The vehicle state amount detected by the first vehicle state detector is separated into adjustment components and prediction components by the threshold frequency, and based on the ratio therebetween, the turning performance score of the turning vehicle is calculated. This process evaluates vehicle stability without regard to the amount of turning of the vehicle.

Further, a turning performance score of the vehicle is calculated based on at least one of vehicle state amounts of a roll direction, a pitch direction and a caster angle, which influence the steering angle of the saddle riding type vehicle. This enables a proper and accurate evaluation of the turning characteristic of the saddle riding type vehicle. The vehicle state amount detected by the second vehicle state detector is separated into adjustment components and prediction components by the threshold frequency, and the turning performance score of the turning vehicle is calculated based on the prediction components. This process accurately evaluates the turning performance of the vehicle properly.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 18 is a view showing a characteristic classification table classified according to various scores according to a preferred embodiment of the present invention.

DETAILED DESCRIPTION OF THE PREFERRED EMBODIMENTS

Preferred embodiments of the present invention will be described hereinafter with reference to the drawings.

Here, a two-wheeled motor vehicle will be described as a non-limiting example of the saddle riding type vehicle including a rider characteristic determining apparatus according to a preferred embodiment of the present invention. In the following description, front and rear and right and left are based on a traveling direction of the two-wheeled motor vehicle.

Figure 1:
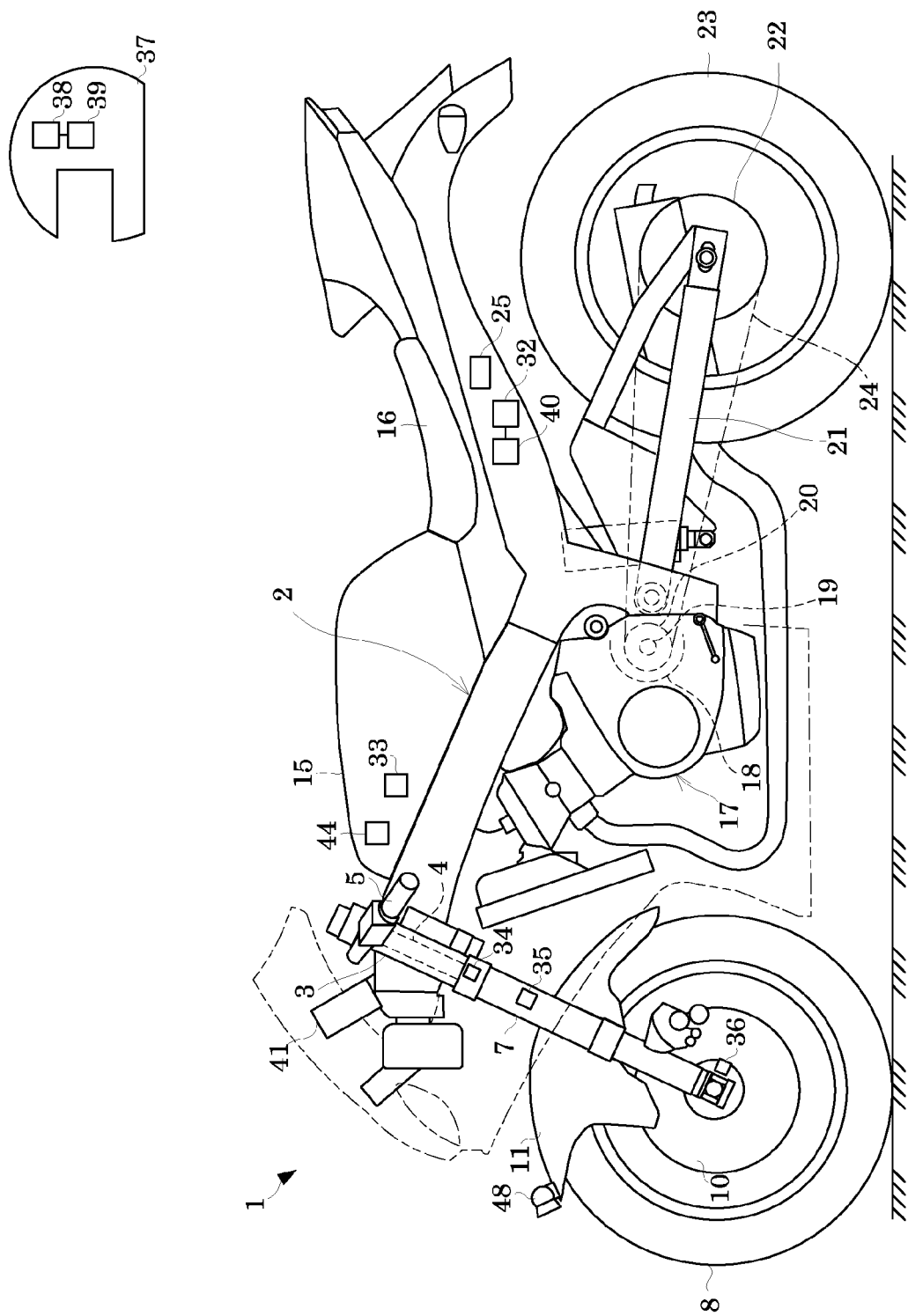
FIG. 1 is a side view showing an outline construction of a two-wheeled motor vehicle including a rider characteristic determining apparatus according to a preferred embodiment of the present invention.

FIG. 1 is a side view showing an outline construction of a two-wheeled motor vehicle including a rider characteristic determining apparatus according to the present preferred embodiment. The two-wheeled motor vehicle 1 includes a main frame 2. A head tube 3 is provided at an upper front end of the main frame 2. A steering shaft 4 is inserted in the head tube 3. A handlebar 5 is connected to the upper end of the steering shaft 4. A brake lever (not shown) is disposed on a right-hand side of the handlebar 5.

A pair of extendible and contractible front forks 7 are connected to the lower end of the steering shaft 4. Thus, the front forks 7 are swingable by turning operation of the handlebar 5. A front wheel 8 is rotatably attached to lower ends of the front forks 7. Vibration of the front wheel 8 is absorbed by expansion and contraction of the front forks 7. Brakes 10 are attached to the lower ends of the front forks 7 to provide braking rotation of the front wheel 8 by operation of the brake lever. A front wheel cover 11 is fixed to the front forks 7 above the front wheel 8.

A fuel tank 15 and a seat 16 are supported as arranged fore and aft on an upper portion of the main frame 2. An engine 17 and a speed changer 18 are held by the main frame 2 in a position below the fuel tank 15. The speed changer 18 includes a drive shaft 19 that outputs power generated by the engine 17. A drive sprocket 20 is connected to the drive shaft 19.

A swing arm 21 is swingably supported by a lower rearward portion of the main frame 2. A driven sprocket 22 and a rear wheel 23 are rotatably supported by a rear end portion of the swing arm 21. A chain 24 is arranged to extend between the drive sprocket 20 and the driven sprocket 22. The power generated by the engine 17 is transmitted to the rear wheel 23 through the speed changer 18, drive shaft 19, drive sprocket 20, chain 24, and driven sprocket 22. An ECU (Electronic Control Unit) 25 is provided below the seat 16 to control operations of various components of the two-wheeled motor vehicle 1.

Figure 2:
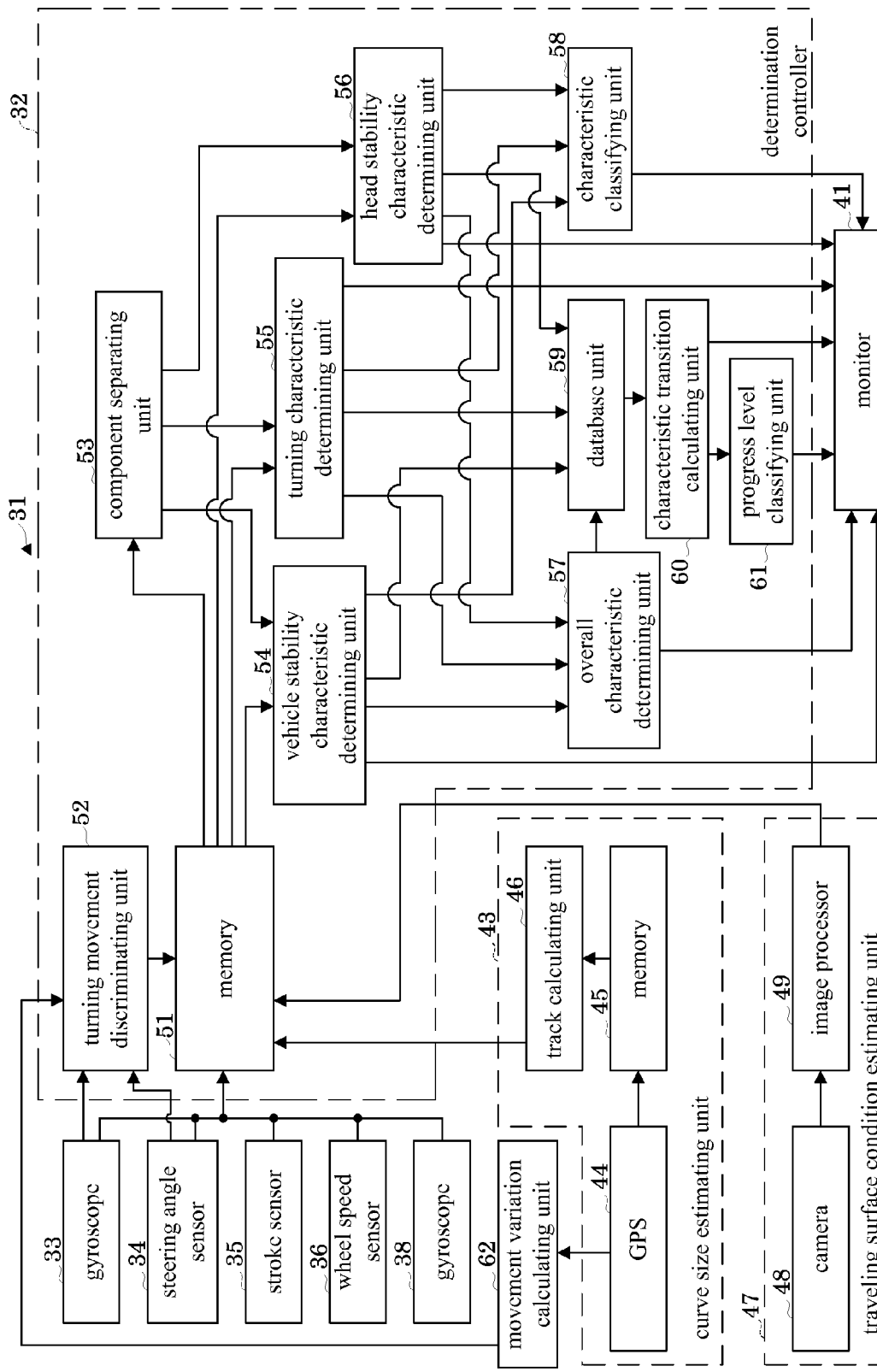
FIG. 2 is a functional block diagram showing a construction of the rider characteristic determining apparatus according to a preferred embodiment of the present invention.

Next, the construction of a rider characteristic determining apparatus 31 will be described with reference to FIGS. 1 and 2. FIG. 2 is a functional block diagram showing the construction of the rider characteristic determining apparatus. The rider characteristic determining apparatus 31 includes a determination controller 32, a gyroscope 33, a steering angle sensor 34, a stroke sensor 35, a wheel speed sensor 36 provided for the front wheel 8, a gyroscope 38 and a radio transmitter 39 provided for a helmet 37, a radio receiver 40, a monitor 41, a curve size estimating unit 43, and a traveling surface condition estimating unit 47.

The determination controller 32 determines the rider's control characteristics. Its details will be described hereinafter. The gyroscope 33 is disposed on the fuel tank 15. The gyroscope 33 detects angular speeds and angles in triaxial directions of yaw, roll and pitch of the two-wheeled motor vehicle 1. That is, it detects a yaw rate, a yaw angle, a roll rate, a roll angle, a pitch rate and a pitch angle of the two-wheeled motor vehicle 1. Detection values of these triaxial angular speeds and angles are sent from the gyroscope 33 to the determination controller 32. The gyroscope 33 corresponds to the first vehicle state detector and the second vehicle state detector according to a preferred embodiment of the present invention.

The steering angle sensor 34 is provided at the upper end of the front forks 7 to detect a steering angle which is a rotation angle of the steering shaft 4. Detection values of the steering angle are sent from the steering angle sensor 34 to the determination controller 32.

The stroke sensor 35 is provided on the front forks 7 to detect amounts of expansion and contraction of the front forks 7. Further, it calculates caster angles of the front forks 7 based on these amounts of expansion and contraction. The calculated caster angles are outputted from the stroke sensor 35 to the determination controller 32. When the front forks 7 are expanded and contracted by a hydraulic suspension, the stroke sensor 7 may calculate the caster angles by detecting a hydraulic pressure of the suspension. The stroke sensor 7 corresponds to the second vehicle state detector according to a preferred embodiment of the present invention.

The wheel speed sensor 36 detects rotating speeds of the front wheel 8. Further, it calculates vehicle speeds of the two-wheeled motor vehicle 1 based on these rotating speeds. The calculated vehicle speeds are outputted from the wheel speed sensor 36 to the determination controller 32.

When the rider steers the handlebar 5 of the two-wheeled motor vehicle 1 in going around a curve, the yaw angle, yaw rate, and steering angle of the two-wheeled motor vehicle 1 will change. When the rider leans the vehicle body of the two-wheeled motor vehicle 1 toward the center of the curve, the roll angle and roll rate of the two-wheeled motor vehicle 1 will change. When the rider operates the brake lever to slow down the two-wheeled motor vehicle 1 before entering the curve or during curve running, the front forks 7 will contract. This contraction of the front forks 7 will change the pitch angle, pitch rate and caster angle of the two-wheeled motor vehicle 1.

The yaw angle, yaw rate, roll angle, roll rate, pitch angle, pitch rate, caster angle, steering angle and vehicle speed of the two-wheeled motor vehicle 1 are called vehicle state amounts.

The gyroscope 38 detects a pitch rate of the helmet 37. That is, variations of a head position of the rider in steering action are detectable by detecting the pitch rate of the rider's head. Detection values of the pitch rate of the rider's head are sent from the gyroscope 38 to the radio transmitter 39, and are sent from the radio transmitter 39 to the two-wheeled motor vehicle 1. The detection values of the pitch rate of the rider's head sent are received by the radio receiver 40 provided for the two-wheeled motor vehicle 1, and are sent from the radio receiver 40 to the determination controller 32. Although the pitch rate of the rider's head is preferably detected in this preferred embodiment, the pitch angle, yaw rate, and yaw angle may serve the purpose. The pitch rate, pitch angle, yaw rate, and yaw angle of the rider' head are called head movement amounts.

The monitor 41 is disposed on the front end portion of the main frame 2 to display to the rider the rider's control characteristics determined by the determination controller 32. The monitor 41 provides the rider with road information and various information concerning the two-wheeled motor vehicle 1 from the ECU 25, besides the control characteristics. The monitor 41 corresponds to the characteristic presenter according to a preferred embodiment of the present invention.

The curve size estimating unit 44 estimates the curve size of a curve the two-wheeled motor vehicle 1 has run around. The curve size estimating unit 44 includes a GPS (Global Positioning System) 44 that measures positions of the two-wheeled motor vehicle 1, a memory 45 that stores a history of traveling positions of the two-wheeled motor vehicle 1, and a track calculating unit 46 that calculates a track run by the two-wheeled motor vehicle 1 based on the running history stored in the memory 45, and estimating the curve size.

The GPS 44 is disposed forward of the fuel tank 15. The memory 45 and the track calculating unit 46 may be provided separately from the determination controller 32, or may be included in the interior of the determination controller 32. The track calculating unit 46, based on a track of GPS during a turning run stored in the memory 45, calculates a radius of a circumscribed circle of a polygon described by this track. Consequently, the curvature of the curve run by the two-wheeled motor vehicle 1 can be calculated, to estimate the curve size. The calculated curvature is sent to the determination controller 32. Since this curvature calculation method is an example, the curve size may be estimated by other methods.

The traveling surface condition estimating unit 47 includes a camera 48 that photographs a traveling surface ahead of the two-wheeled motor vehicle 1, and an image processor 49 that carries out image recognition of the traveling surface condition from a traveling surface image photographed by the camera 48, to estimate a coefficient of friction $\mu$, of the traveling surface. The camera 48 is disposed at a forward end of the front wheel cover 11. The image processor 49 may be provided separately from the determination controller 32, or may be included in the interior of the determination controller 32.

The image processor 49 carries out image recognition as to whether the traveling surface image photographed by the camera 48 is wet or dry, or snow-covered, on-road or off-road. A coefficient of friction $\mu$ specified beforehand for each traveling surface condition recognized through images is set to each traveling surface condition. The set coefficient of friction $\mu$ is sent to the determination controller 32. The coefficient of friction $\mu$ of the traveling surface, although estimated in this way, may be estimated by other methods. For example, the coefficient of friction $\mu$ of the traveling surface may be estimated by measuring vibration of a tire.

Next, the construction of the determination controller 32 will be described in detail.

As shown in FIG. 2, the gyroscope 33, steering angle sensor 34, stroke sensor 35, wheel speed sensor 36, gyroscope 38 through the radio transmitter 39 and the radio receiver 40, curve size estimating unit 43, and traveling surface condition estimating unit 47 are connected to an input of the determination controller 32. The monitor 41 is connected to an output of the determination controller 32.

The determination controller 32 includes a memory 51, a turning movement discriminating unit 52, a component separating unit 53, a vehicle stability characteristic determining unit 54, a turning characteristic determining unit 55, a head stability characteristic determining unit 56, an overall characteristic determining unit 57, a characteristic classifying unit 58, a database unit 59, a characteristic transition calculating unit 60, and a progress level classifying unit 61.

The vehicle state amounts and the pitch rate detection values of the rider's head inputted to the determination controller 32 are respectively stored in time series in the memory 51.

The turning movement discriminating unit 52 discriminates whether the two-wheeled motor vehicle 1 has carried out a turning movement, which is taken into account in determining the rider's characteristics. Here, the turning movement refers to a case where the yaw rate of the two-wheeled motor vehicle 1 has at least a certain fixed value, and this continues for at least a certain fixed time. When the above conditions are not met, the turning movement discriminating unit 52 does not determine that the two-wheeled motor vehicle 1 has carried out a turning movement.

Figure 3:
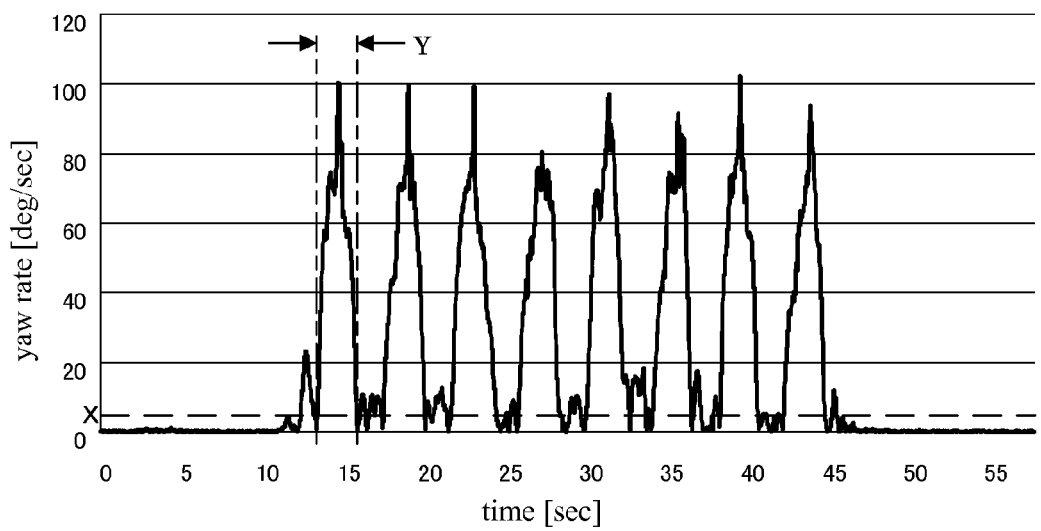
FIG. 3 is a graph illustrating a turning movement determination according to a preferred embodiment of the present invention.

Reference is made to FIG. 3. FIG. 3 is an explanatory view where the turning movement discriminating unit 52 discriminates a turning movement. The turning movement discriminating unit 52 discriminates a turning movement section Y from absolute values of the detection values of the yaw rate inputted from the gyroscope 33. That is, if a section is from a point of time when the absolute values of detection values of the yaw rate of the two-wheeled motor vehicle 1 exceed a threshold X to a point of time when they fall below the threshold X again, and if a duration of this section is at least a minimum duration $Y_{min}$, the turning movement discriminating unit 52 will discriminate this section to be a turning movement section Y.

When the section from the point of time when the detection values of the yaw rate of the two-wheeled motor vehicle 1 exceed the threshold X to the point of time when they fall below the threshold X again is less than the minimum duration $Y_{min}$, the turning movement discriminating unit 52 will not discriminate this section to be a turning movement section. The value of threshold X may be set as appropriate according to the type of the two-wheeled motor vehicle 1. Although the above is a method of discriminating the turning movement section Y using the yaw rate, the turning movement section Y may be discriminated using the yaw angle. When the turning movement section Y is discriminated using the yaw angle, the turning movement section Y may be discriminated as described above after converting angle data into yaw rate data by time differentiation, for example.

Figure 5:
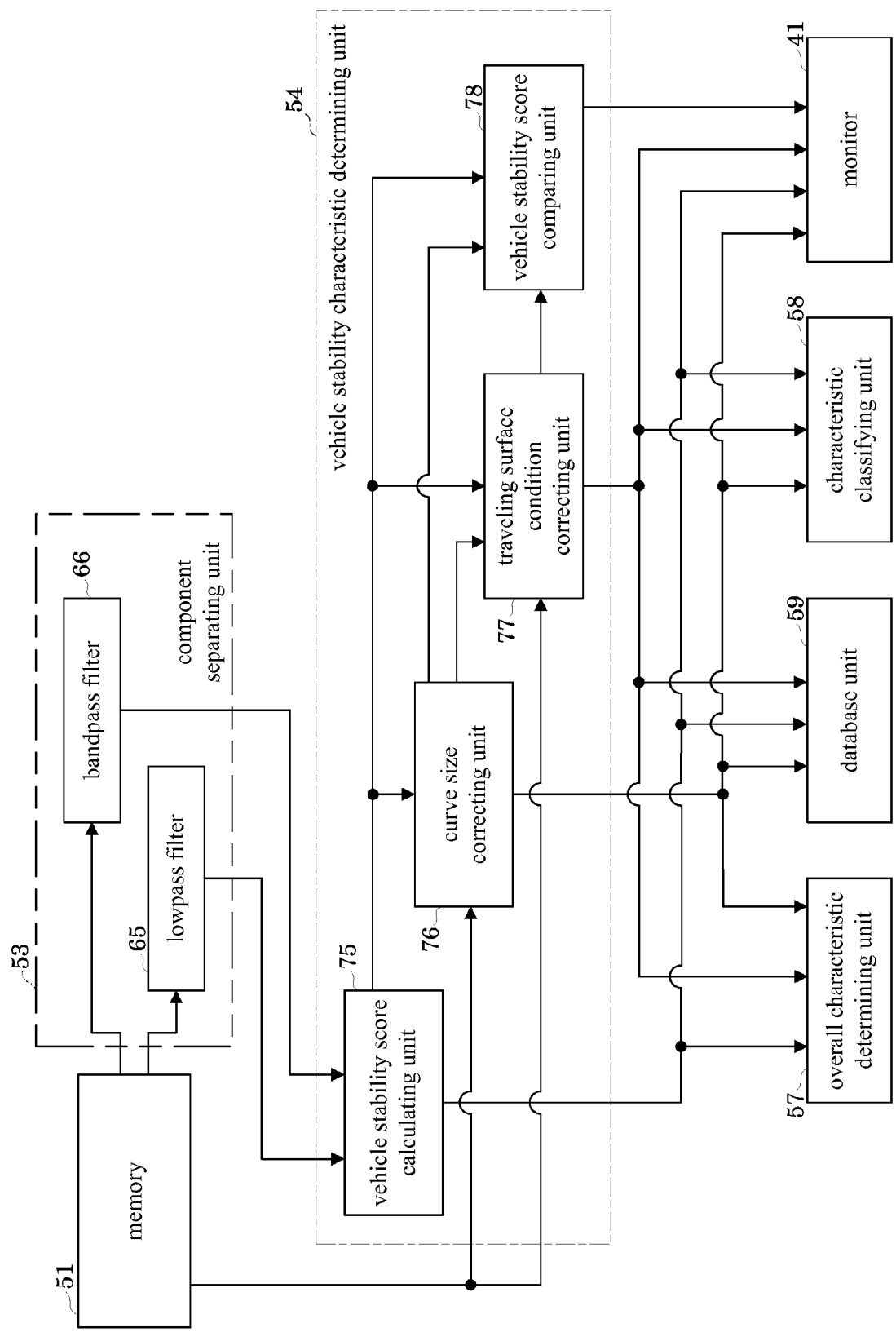
FIG. 5 is a functional block diagram showing a vehicle stability characteristic determining unit and adjacent components according to a preferred embodiment of the present invention.

Reference is made to FIG. 5. FIG. 5 is a functional block diagram showing the vehicle stability characteristic determining unit and adjacent components. When the turning movement discriminating unit 52 discriminates the turning movement section Y, the detection value of each vehicle state amount stored in the memory 51 during the turning movement section Y is sent to the component separating unit 53. The component separating unit 53 preferably includes a lowpass filter 65 and a bandpass filter 66. Each detection value inputted to the component separating unit 53 filtered by the lowpass filter 65 and bandpass filter 66.

Figure 4:
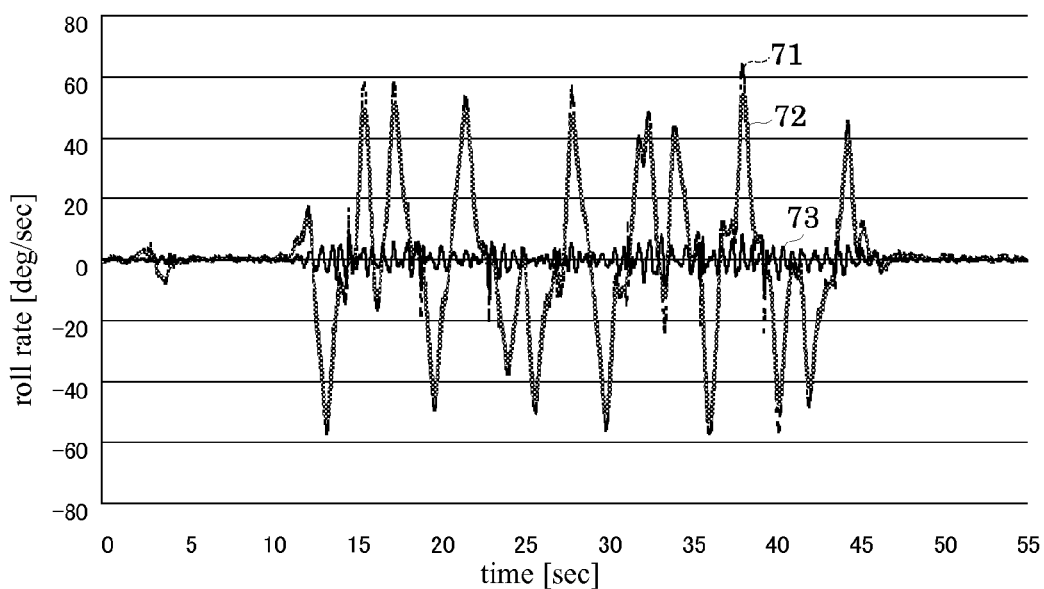
FIG. 4 is a graph illustrating a component separation of detection values according to a preferred embodiment of the present invention.

A component separation of each detection value will be described with reference to FIG. 4. FIG. 4 is a graph illustrating a component separation of the detection values. The vehicle state amounts whose components are separable by the component separating unit 53 include yaw rate, yaw angle, roll rate, roll angle, pitch rate, pitch angle, steering angle, and caster angle. The head movement amounts whose components are separable by the component separating unit 53 include head pitch rate, head pitch angle, head yaw rate, and head yaw angle. The component separation by filtering will be described taking the roll rate for example.

Entire frequency band data 71 of the roll rate inputted to the component separating portion 53 is subjected to filtering by the lowpass filter 65 and bandpass filter 66. The lowpass filter 65 removes high-frequency components higher than a threshold frequency Fc1 which is a value set beforehand. Consequently, low-frequency components 72 are outputted from the lowpass filter 65.

The bandpass filter 66 removes low-frequency components equal to or lower than the threshold frequency Fc1, and removes noise components equal to or higher than a threshold frequency Fc2. Consequently, high-frequency band components 73 are outputted from the bandpass filter 66. Since frequency components equal to or higher than the threshold frequency Fc2 are noise components, they are irrelevant to the rider's characteristic determination.

As a result of the time series data of each detection value stored in the memory 51 put to the filtering by the lowpass filter 65 and bandpass filter 66, each detection value is separated into low-frequency band components and high-frequency band components. The threshold frequency Fc1 for separating into low-frequency band components and high-frequency band components, preferably is a value between about 0.2 Hz and about 5 Hz, for example. The threshold frequency Fc1 may be set according to the characteristics to be determined. When determining the rider's characteristics, for example, the threshold frequency Fc1 may be set so that the difference between beginner and experienced person may be a maximum. The threshold frequency Fc2, preferably, is a value equal to or higher than about 2 Hz to about 10 Hz, for example. However, the threshold frequency Fc2 must certainly be a larger value than the threshold frequency Fc1.

The vehicle stability characteristic determining unit 54 includes a vehicle stability score calculating unit 75, a curve size correcting unit 76, a traveling surface condition correcting unit 77, and a vehicle stability score comparing element 78.

The vehicle stability score calculating unit 75 receives each detection value in the turning movement section Y of the two-wheeled motor vehicle 1 filtered by the lowpass filter 65 and bandpass filter 66. Here, the yaw rate, roll rate, pitch rate are inputted by way of example.

Figure 6:
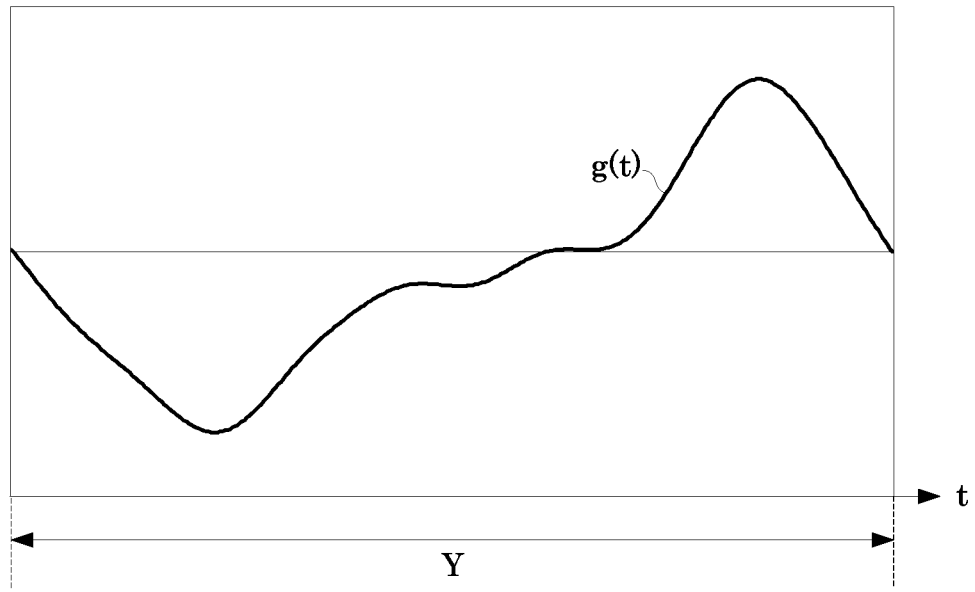
FIG. 6 is a graph showing low-frequency band components according to a preferred embodiment of the present invention.
Figure 7:
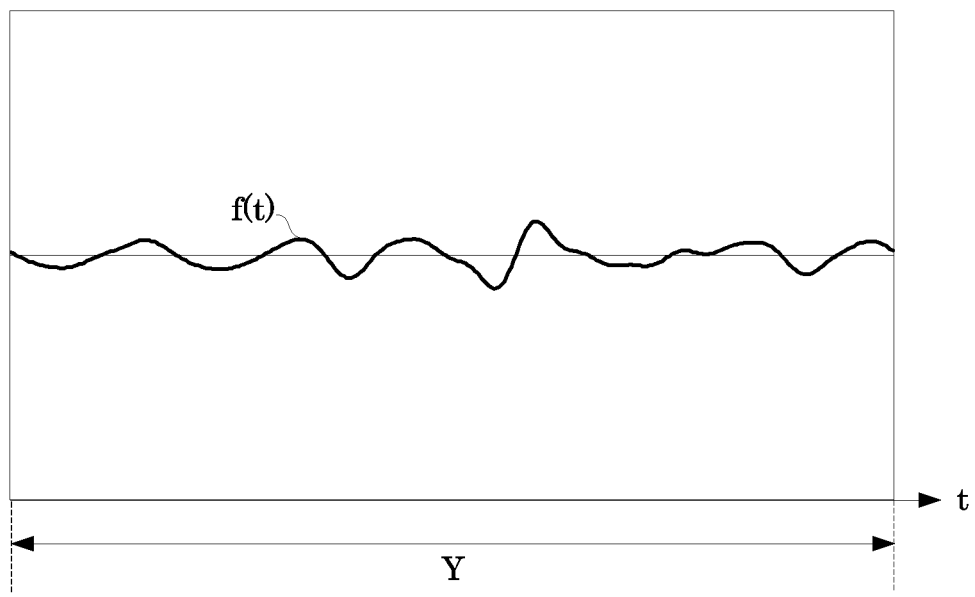
FIG. 7 is a graph showing high-frequency band components according to a preferred embodiment of the present invention.

Reference is made to FIG. 6. FIG. 6 is a graph showing a low-frequency band g(t) of the yaw rate in the turning section Y as an example. The low-frequency band g(t) of each rate separated by the threshold frequency Fc1 is interpreted as prediction components for the rider making a turn around a curve. As shown in FIG. 7, a high-frequency band f(t) is interpreted as adjustment components adjusted when the rider turned around a curve. FIG. 7 is a graph showing the high-frequency band f(t) of the yaw rate in the turning section Y as an example.

For each of the yaw rate, roll rate and pitch rate, average values of integral values per unit time of the prediction components and adjustment components of each rate in the turning section Y are calculated from the following equation (1). Values obtained by dividing the values derived corresponding to the respective prediction components by values corresponding to the adjustment components are regarded as stability indexes ($S_{yaw}$, $S_{roll}$, $S_{pitch}$) of the yaw rate, roll rate and pitch rate in one turning section Y.

$$S = \frac{\frac{1}{Y}\int |g(t)|dt}{\frac{1}{Y}\int |f(t)|dt} \quad (1)$$

When the rider does smooth control relative to a curve, an integral quantity of absolute values of the low-frequency band g(t) becomes large, and an integral quantity of absolute values of the high-frequency band f(t) becomes small. When fine and rapid adjusting control is carried out during curve running, the integral quantity of absolute values of the high-frequency band f(t) will become large, and the integral quantity of absolute values of the low-frequency band g(t) will become that much smaller. Thus, by using as an index the ratio between the integral quantity of absolute values of the low-frequency band g(t) and the integral quantity of absolute values of the high-frequency band f(t), the rider's characteristics during curve running can be expressed by scores.

The vehicle stability indexes of the two-wheeled motor vehicle 1 can be calculated by obtaining ratios between the integral quantity of absolute values of the low-frequency band g(t) and the high-frequency band f(t) of the yaw rate, roll rate and pitch rate during turning movement of the two-wheeled motor vehicle 1. Further, as in the following equation (2), a vehicle stability score $S_v$ which is a weighted linear sum of the above-mentioned three stability indexes ($S_{yaw}$, $S_{roll}$, $S_{pitch}$) is calculated. In equation (2), $k_1$, $k_2$ and $k_3$ are weighting factors. Apart from the weighted linear sum, the vehicle stability score $S_v$ may be calculated as a product, a sum of products, or conditional probability.

$$S_v = k_1 \cdot S_{yaw} + k_2 \cdot S_{roll} + k_3 \cdot S_{pitch} \quad (2)$$

The curve size correcting unit 76 corrects the calculated vehicle stability score $S_v$ in response to a curve size estimated by the curve size estimating unit 43. The curve size estimated by the curve size estimating unit 43 is stored in the memory 51. When the turning movement discriminating unit 52 discriminates that the two-wheeled motor vehicle 1 has made a turning movement, the curve size for the turning movement section Y is sent from the memory 51 to the curve size correcting unit 76.

Since, generally, the larger the curvature, a curve has the sharper curving, the rider has difficulty in steering. So, the curve size is read from the memory 51 for each curve to have been turned, and the vehicle stability score $S_v$ is corrected according to the estimated curve size. Consequently, with the influence of the curve size reduced, comparison can be made even between vehicle stability scores $S_v$ obtained when different curve sizes are turned.

The traveling surface condition correcting unit 77 corrects the curve-corrected vehicle stability score $S_v$ according to traveling surface conditions estimated by the traveling surface condition estimating unit 47. The traveling surface conditions estimated by the traveling surface condition estimating unit 47 are stored in the memory 51. When the turning movement discriminating unit 52 discriminates that the two-wheeled motor vehicle 1 has made a turning movement, a traveling surface condition for the turning movement section is sent from the memory 51 to the traveling surface condition correcting unit 77.

Since, generally, the larger the coefficient of friction μ of the traveling surface, the frictional force between the front wheel 8 and rear wheel 23 and the traveling surface acts the more greatly, it becomes easy for the rider to control the two-wheeled motor vehicle 1. When the coefficient of friction μ of the traveling surface is small, control becomes difficult since the front wheel 8 and rear wheel 23 slip easily during the turn. Thus, the vehicle stability score $S_v$ has a certain relationship with the coefficient of friction μ of the traveling surface. So, the vehicle stability score $S_v$ is corrected in response to the traveling surface condition estimated for the turning movement section Y. Consequently, the vehicle stability score $S_v$ calculated has a reduced influence of the traveling surface condition.

The vehicle stability score $S_v$ corrected by the traveling surface condition correcting unit 77 is outputted to the overall characteristic determining unit 57, characteristic classifying unit 58, database unit 59, monitor 41, and vehicle stability score comparing unit 78.

The vehicle stability score comparing unit 78 compares the vehicle stability score $S_v$ corrected in response to the curve size and the traveling surface condition, with a reference value of the vehicle stability characteristics set beforehand. Consequently, the rider's vehicle stability characteristics can be determined for different levels. A determined result is outputted to the monitor 41 and displayed to the rider. The rider can confirm the vehicle stability characteristic of his turning movement intuitively by learning the vehicle stability characteristics determined for different levels.

Figure 8:
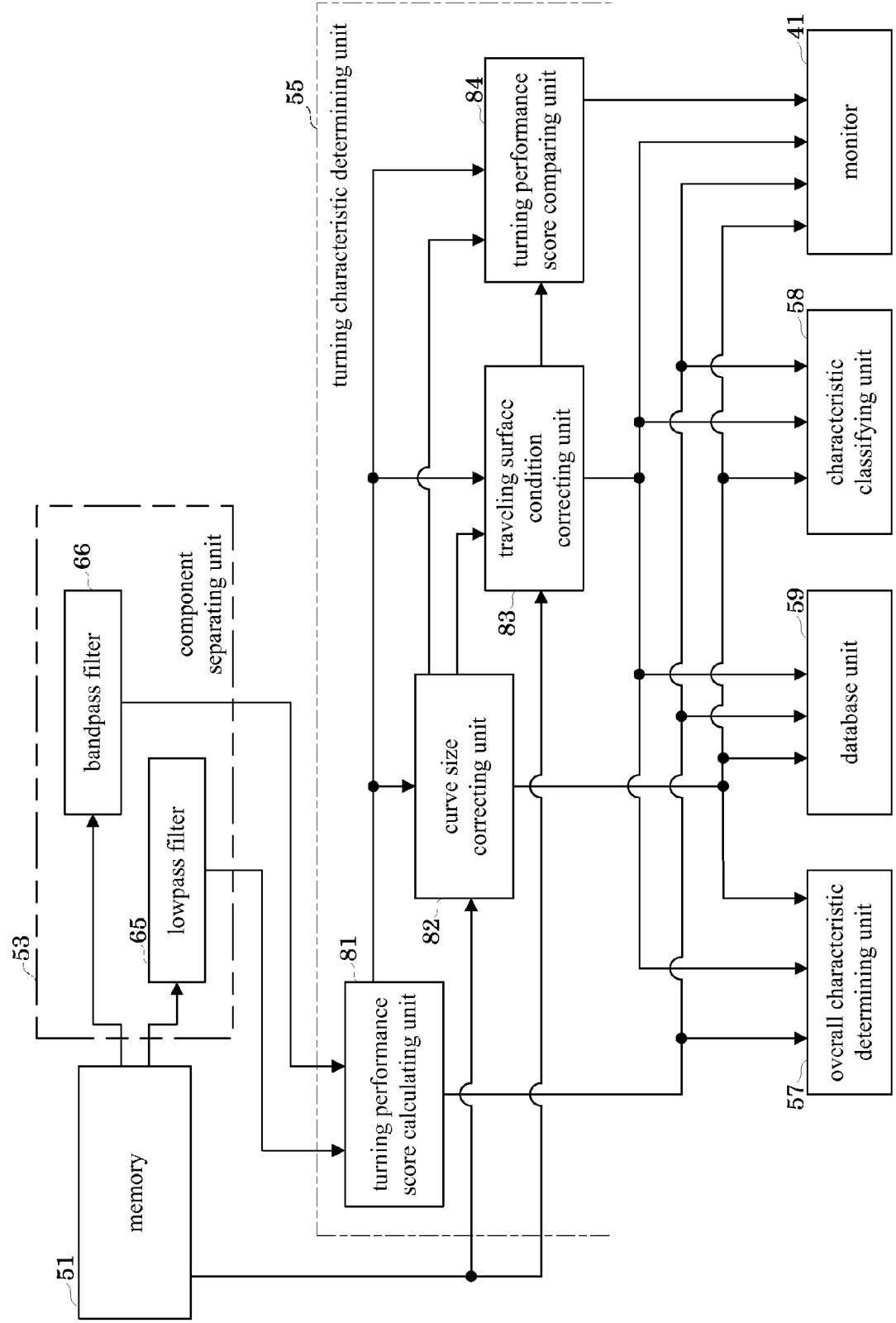
FIG. 8 is a functional block diagram showing a turning characteristic determining unit and adjacent components according to a preferred embodiment of the present invention.

Reference is made to FIG. 8. FIG. 8 is a functional block diagram showing the turning characteristic determining unit and adjacent components. The turning characteristic determining unit 55 includes a turning performance score calculating unit 81, a curve size correcting unit 82, a traveling surface condition correcting unit 83, and a turning performance score comparing unit 84.

The turning performance score calculating unit 81 receives each detection value in the turning movement section Y of the two-wheeled motor vehicle 1 filtered by the lowpass filter 65. Here, the steering angle, roll angle, and pitch angle or caster angle are inputted by way of example. Vehicle speeds in the turning movement section Y of the two-wheeled motor vehicle 1 are inputted from the memory 51 to the turning performance score calculating unit 81.

Figure 9:
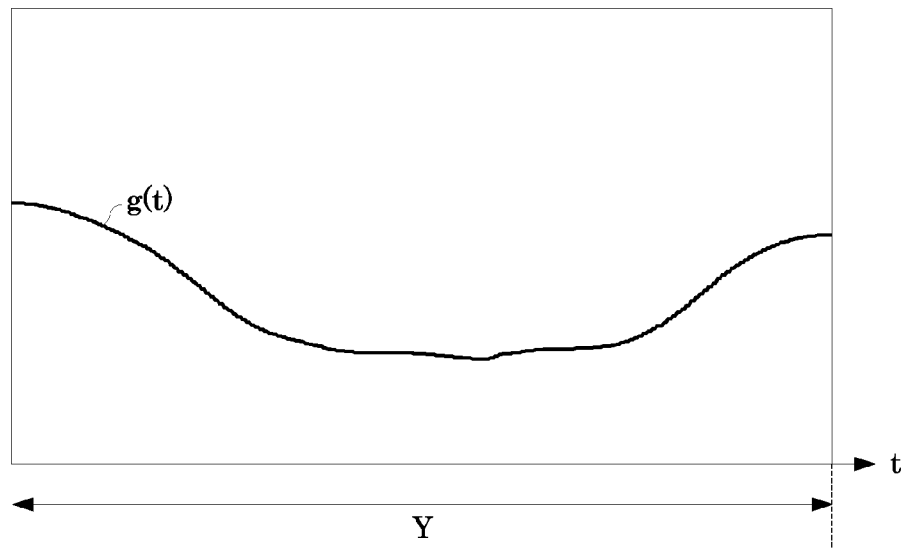
FIG. 9 is a graph showing low-frequency band components according to a preferred embodiment of the present invention.

Reference is made to FIG. 9. FIG. 9 is a graph showing low-frequency band components of a detected angle. The low-frequency band g(t) of each angle is interpreted as prediction components of the rider turning the curve. When the rider does smooth handlebar control relative to the curve, the quantity of absolute values of the low-frequency band g(t) is large. Different values for various angles may be used as the threshold frequency fc1 used in the frequency separation of each rate.

$$T = \frac{1}{Y} \int |f(t)| dt \qquad (3)$$

Using equation (3) above, an average value of integral values per unit time of the prediction components in the turning section Y is calculated for each angle of the steering angle, roll angle, and pitch or caster angle. The calculated values are regarded as turning performance indexes $T_{steer}$, $T_{roll}$, $T_{pitch(caster)}$ of the steering angle, roll angle, and pitch or caster angle.

An average vehicle speed $T_{speed}$ in the turning section Y is calculated from the inputted vehicle speeds of the turning section Y. A weighted linear sum of these three turning performance indexes and the average vehicle speed is calculated as a turning performance score $T_v$ as in the following equation (4). In equation (4), $k_4$, $k_5$, $k_6$ and $k_7$ are weighting factors. Apart from the weighted linear sum, the turning performance score $T_v$ may be calculated as a product, a sum of products, or conditional probability.

$$T_v = k_4 \cdot T_{steer} + k_5 \cdot T_{roll} + k_6 \cdot T_{pitch(caster)} + k_7 \cdot T_{speed} \qquad (4)$$

The curve size correcting unit 82 corrects the calculated turning performance score $T_v$ according to the curve size estimated by the curve size estimating unit 43. When the turning movement discriminating unit 52 discriminates that the two-wheeled motor vehicle 1 has made a turning movement, the curve size in the turning movement section Y is sent from the memory 51 to the curve size correcting unit 82. Whenever the turning movement section Y is discriminated, the curve size is read from the memory 51, and the turning performance score $T_v$ is corrected according to the estimated curve size. Consequently, with the influence of the curve size reduced, comparison can be made even between turning performance scores $T_v$ obtained when different curve sizes are turned.

Figure 10:
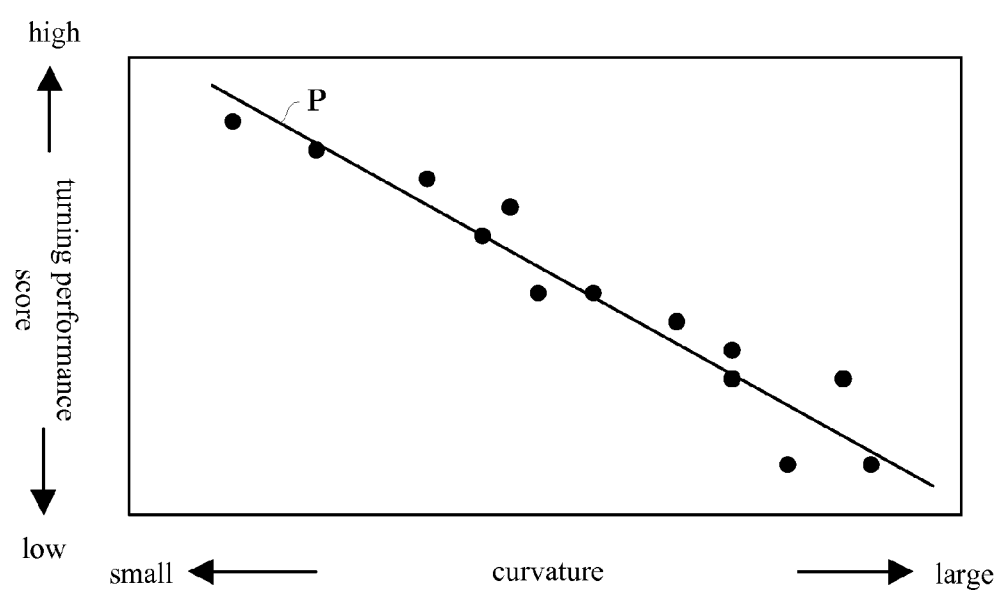
FIG. 10 is a graph showing a relationship between curvature before a curve size correction and turning performance score according to a preferred embodiment of the present invention.
Figure 11:
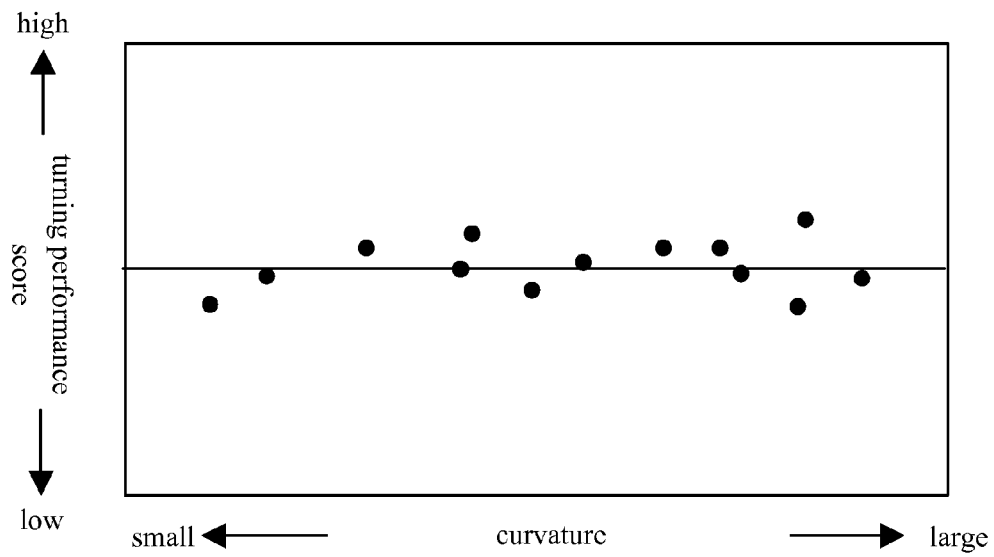
FIG. 11 is a graph showing a relationship between curvature after the curve size correction and turning performance score according to a preferred embodiment of the present invention.

A correction of the turning performance score $T_v$ by curve size will be described with reference to FIG. 10. FIG. 10 is a graph showing a relationship between curvature before correction and turning performance score. Curves of various curvatures are turned by a test driver beforehand on the condition that only the curvatures are different, and sampling is made as to what turning performance scores $T_v$ are calculated. Next, a relationship between the curvatures and the turning performance scores $T_v$ sampled is calculated. The inclination of straight line P shown in FIG. 10 indicates the relationship between the curvatures and the turning performance scores $T_v$. By carrying out a conversion correction to make this inclination zero, as shown in FIG. 11, the turning performance scores $T_v$ with a reduced influence of curvature can be obtained. FIG. 11 is a graph showing a relationship between curvature after the curve size correction and turning performance score $T_v$. The relationship between sampled curvatures and turning performance scores $T_v$ is stored in the curve size correcting unit 82. The correction of vehicle stability score $S_v$ by the curve size correcting unit 76 is made similarly.

The traveling surface condition correcting unit 83 corrects the turning performance scores $T_v$ after the curve correction according to the traveling surface conditions estimated by the traveling surface condition estimating unit 47. The traveling surface conditions estimated by traveling surface condition estimating unit 47 are stored in the memory 51. When the turning movement discriminating unit 52 discriminates that the two-wheeled motor vehicle 1 has made a turning movement, a traveling surface condition for the turning movement section is sent from the memory 51 to the traveling surface condition correcting unit 87.

Figure 12:
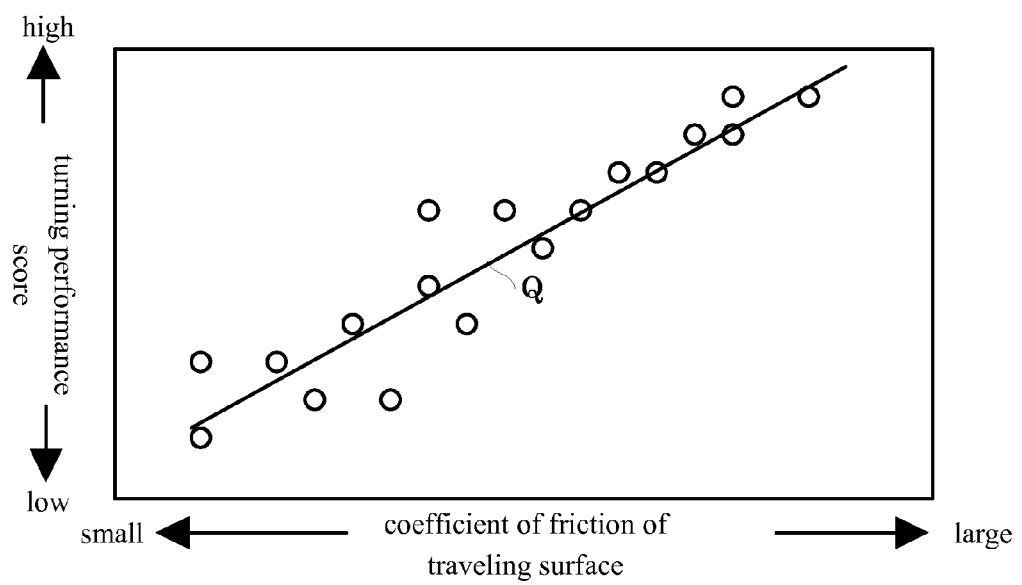
FIG. 12 is a graph showing a relationship between traveling surface friction coefficient before a correction and turning performance score according to a preferred embodiment of the present invention.

Generally, the turning performance score $T_v$ has a certain relationship with the coefficient of friction μ of the traveling surface. So, the turning performance score $T_v$ is corrected in response to the traveling surface condition estimated for each curve turned. A correction of the turning performance score $T_v$ by traveling surface condition will be described with reference to FIG. 12. FIG. 12 is a graph showing a relationship between traveling surface friction coefficient before a correction and turning performance score. Curves are turned by a test driver beforehand on the condition that only the traveling surface conditions are different, and sampling is made as to what turning performance scores $T_v$ are calculated.

Figure 13:
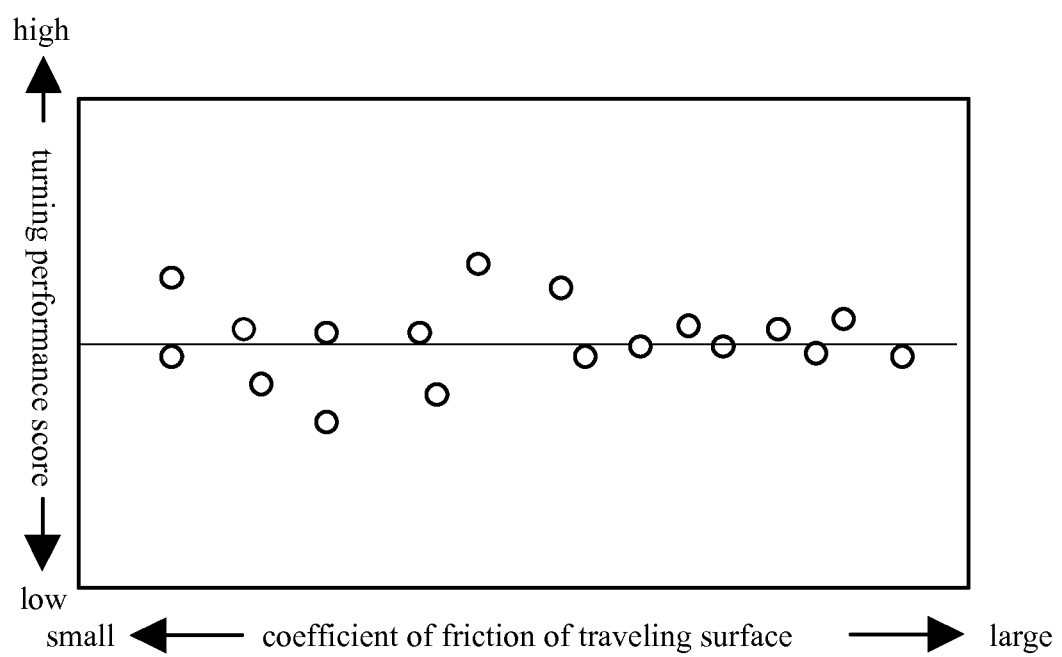
FIG. 13 is a graph showing a relationship between traveling surface friction coefficient after the correction and turning performance score according to a preferred embodiment of the present invention.

Next, a relationship between the coefficient of friction μ of the traveling surface and the turning performance scores $T_v$ sampled is calculated. The inclination of straight line Q shown in FIG. 12 indicates the relationship between the coefficient of friction μ of the traveling surface and the turning performance scores $T_v$. By carrying out a conversion correction to make this inclination zero, as shown in FIG. 13, the turning performance scores $T_v$ with a reduced influence of the coefficient of friction μ of the traveling surface can be obtained. FIG. 13 is a graph showing a relationship between the coefficients of friction μ of the traveling surface after the traveling surface condition correction and the turning performance scores $T_v$. The relationship between sampled coefficients of friction μ of the traveling surface and turning performance scores $T_v$ is stored in the traveling surface condition correcting unit 83. The correction of vehicle stability score $S_v$ by the traveling surface condition correcting unit 77 is made similarly.

The turning performance scores $T_v$ corrected by the traveling surface condition correcting unit 83 are outputted to the overall characteristic determining unit 57, characteristic classifying unit 58, database unit 59, monitor 41, and turning performance score comparing unit 84.

The turning performance score comparing unit 84 compares the turning performance scores $T_v$ corrected according to the curve size and traveling surface condition, with a reference value of the turning characteristics set beforehand. Consequently, the rider's turning characteristics can be determined for different levels. A determined result is outputted to the monitor 41 and displayed to the rider. The rider can confirm his turning characteristic of turning movement intuitively by learning the turning characteristics determined for different levels.

Figure 14:
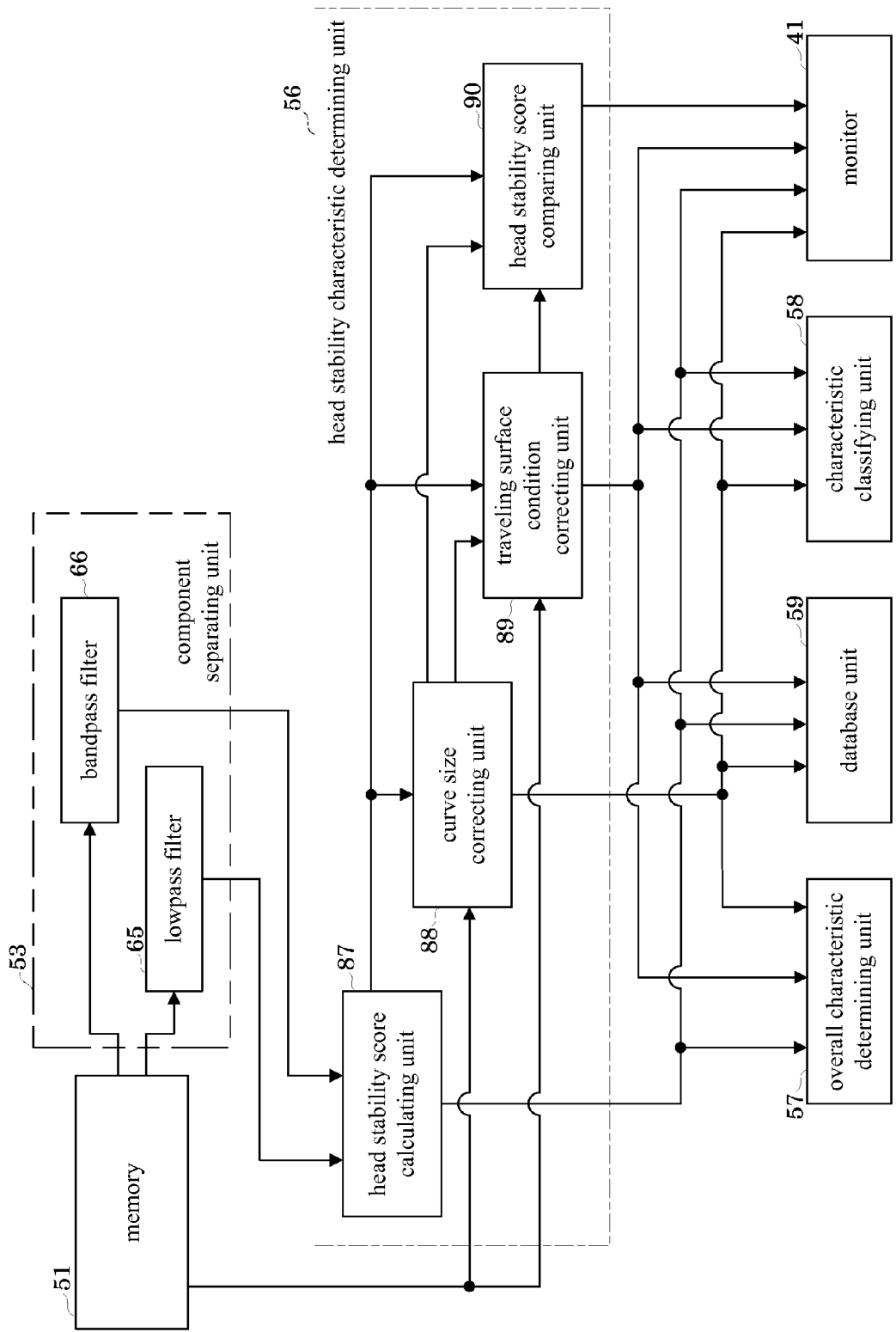
FIG. 14 is a functional block diagram showing a head stability characteristic determining unit and adjacent components according to a preferred embodiment of the present invention.

Reference is made to FIG. 14. FIG. 14 is a functional block diagram showing the head stability characteristic determining unit and adjacent components. The head stability characteristic determining unit 56 includes a head stability score calculating unit 87, a curve size correcting unit 88, a traveling surface condition correcting unit 89, and a head stability score comparing unit 90.

The head stability score calculating unit 87 receives each detection value in the turning movement section Y of the two-wheeled motor vehicle 1 filtered by the lowpass filter 65 and bandpass filter 66. Here, the pitch rate of the rider's head is inputted by way of example.

When a two-wheeled vehicle turns a curve, the two-wheeled vehicle itself leans toward the center of the curve, and therefore the rider's head sways. When a four-wheeled vehicle turns a curve, the driver hardly leans toward the center of the curve, and therefore the rider's head sways very little. The swaying of the rider's head on the two-wheeled vehicle varies with operation of the rider per se. Generally, with the more experienced rider, there is the less jiggly sway in the pitch direction of the rider's head.

When turning the same curve, an experienced rider can suppress the jiggly sway of the head by absorbing posture variations by the rider per se. On the other hand, a rider who is a beginner will not be able to absorb variations of his own position but the head will sway in a jiggly manner.

Figure 15:
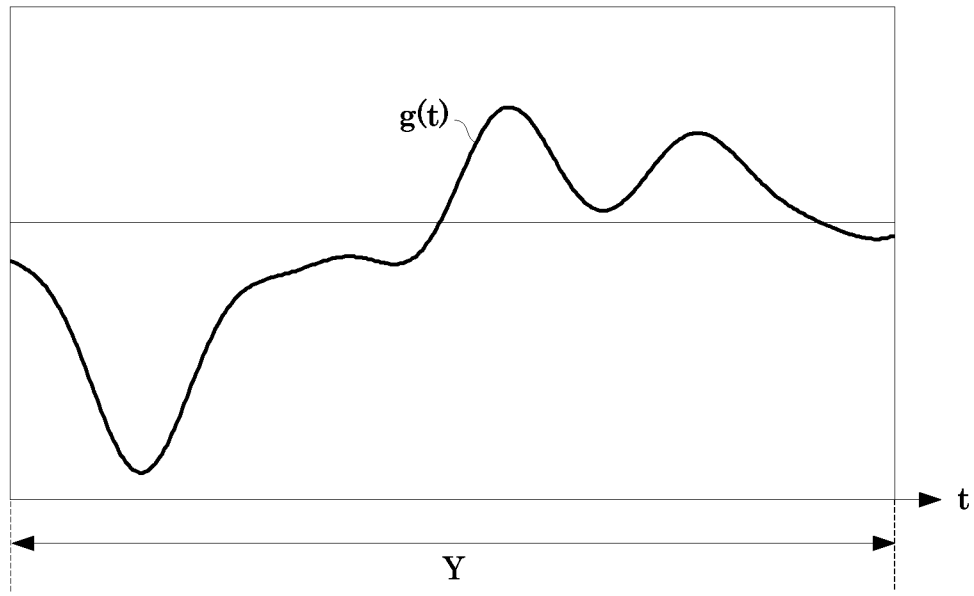
FIG. 15 is a graph showing low-frequency band components of a head pitch rate according to a preferred embodiment of the present invention.
Figure 16:
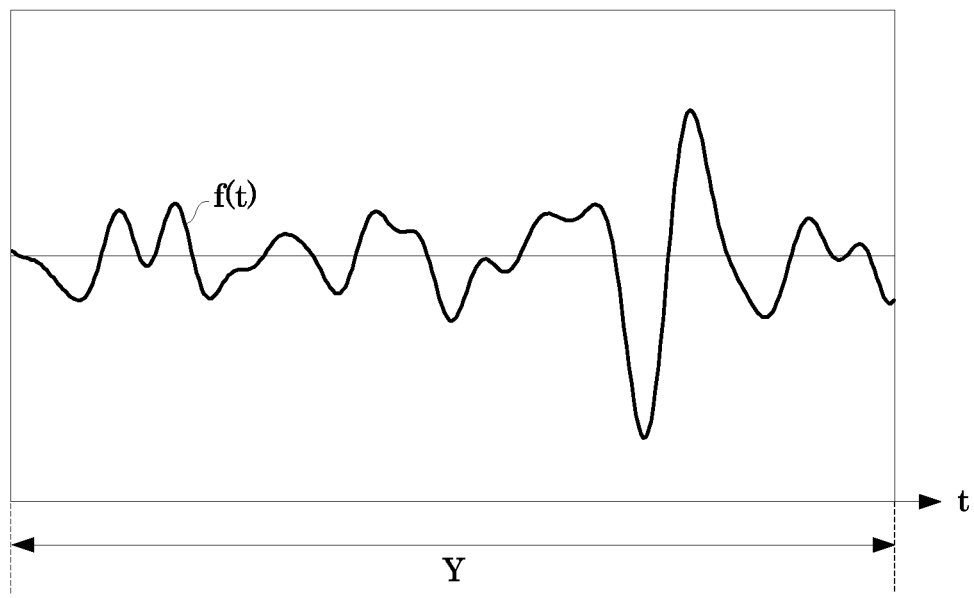
FIG. 16 is a graph showing high-frequency band components of the head pitch rate according to a preferred embodiment of the present invention.

Thus, the time series data of the pitch rate of the head is separated by frequency characteristic. Low-frequency band components g(t) as shown in FIG. 15 are interpreted as prediction components, and high-frequency band components f(t) as shown in FIG. 16 as adjustment components. FIG. 15 is a graph showing low-frequency band components of the pitch rate of the head. FIG. 16 is a graph showing high-frequency band components of the pitch rate of the head. Average values of integral values per unit time of the respective components in the turning section Y are calculated. As shown in the following equation (5), a value obtained by dividing the obtained prediction component by the adjustment component is regarded as head stability score H in one turning section.

$$H = \frac{\frac{1}{Y}\int |g(t)|dt}{\frac{1}{Y}\int |f(t)|dt} \tag{5}$$

When the rider smoothly changes the rider's own position relative to a curve, the movement of the head also becomes smooth, whereby an integral quantity of absolute values of the low-frequency band g(t) will become large, and an integral quantity of absolute values of the high-frequency band f(t) will become small. When the rider's own position changes finely during curve running, the movement of the rider's head also becomes fine, whereby the integral quantity of absolute values of the high-frequency band f(t) will become large, and the integral quantity of absolute values of the low-frequency band g(t) will become that much smaller. Thus, by using as an index the ratio between the integral quantity of absolute values of the low-frequency band g(t) and the integral quantity of absolute values of the high-frequency band f(t), the rider's head stability characteristics during curve running can be expressed by scores.

Next, the curve size correcting unit 88 corrects the calculated head stability score H in response to the curve size estimated by the curve size estimating unit 43. The curve size estimated by the curve size estimating unit 43 is stored in the memory 51. When the turning movement discriminating unit 52 discriminates that the two-wheeled motor vehicle 1 has made a turning movement, the curve size for the turning movement section Y is sent from the memory 51 to the curve size correcting unit 88.

The curve size is read from the memory 51 for each curve for which a turning movement has been discriminated, and the head stability score H is corrected according to the estimated curve size. Consequently, with the influence of the curve size reduced, comparison can be made even between head stability scores H obtained when different curve sizes are turned. The method of correction according to the curve size is the same as that of correction of the curve size for the turning performance scores $T_v$.

The traveling surface condition correcting unit 89 corrects the curve-corrected head stability score H according to the traveling surface conditions estimated by the traveling surface condition estimating unit 47. The traveling surface conditions estimated by the traveling surface condition estimating unit 47 are stored in the memory 51. When the turning movement discriminating unit 52 discriminates that the two-wheeled motor vehicle 1 has made a turning movement, a traveling surface condition for the turning movement section is sent from the memory 51 to the traveling surface condition correcting unit 89.

The head stability score H and the coefficient of friction of the traveling surface have a certain relationship therebetween. So, the head stability score H is corrected in response to the traveling surface condition estimated for the turning movement section Y. Consequently, the head stability score H calculated has a reduced influence of the traveling surface condition. The method of correction according to the traveling surface condition is the same as that of correction of the traveling surface condition for the turning performance scores $T_v$.

The head stability score H corrected by the traveling surface condition correcting unit 89 is outputted to the overall characteristic determining unit 57, characteristic classifying unit 58, database unit 59, monitor 41, and head stability score comparing unit 90.

The head stability score comparing unit 90 compares the head stability score H corrected in response to the curve size and the traveling surface condition, with a reference value of the head stability characteristics set beforehand. Consequently, the rider's head stability characteristics can be determined for different levels. A determined result is outputted to the monitor 41 and displayed to the rider. The rider can confirm his head stability characteristic of turning movement intuitively by learning the head stability characteristics determined for different levels.

Various characteristic determinations are carried out based on the vehicle stability score $S_v$, turning performance score $T_v$, and head stability score H having undergone the curve size correction and the traveling surface condition correction.

The overall characteristic determining unit 57, using the vehicle stability score $S_v$, turning performance score $T_v$, and head stability score H having undergone the curve size correction and the traveling surface condition correction, calculates the rider's overall characteristic score G for the turning section Y by arithmetic processing of the following equation (6). In the following equation (6), $k_8$, $k_9$ and $k_{10}$ are weighting factors. Apart from the weighted linear sum, the overall characteristic score G may be calculated as a product, a sum of products, or conditional probability.

$$G = k_8 \cdot S_v + k_9 \cdot T_v + k_{10} \cdot H \tag{6}$$

Figure 17:
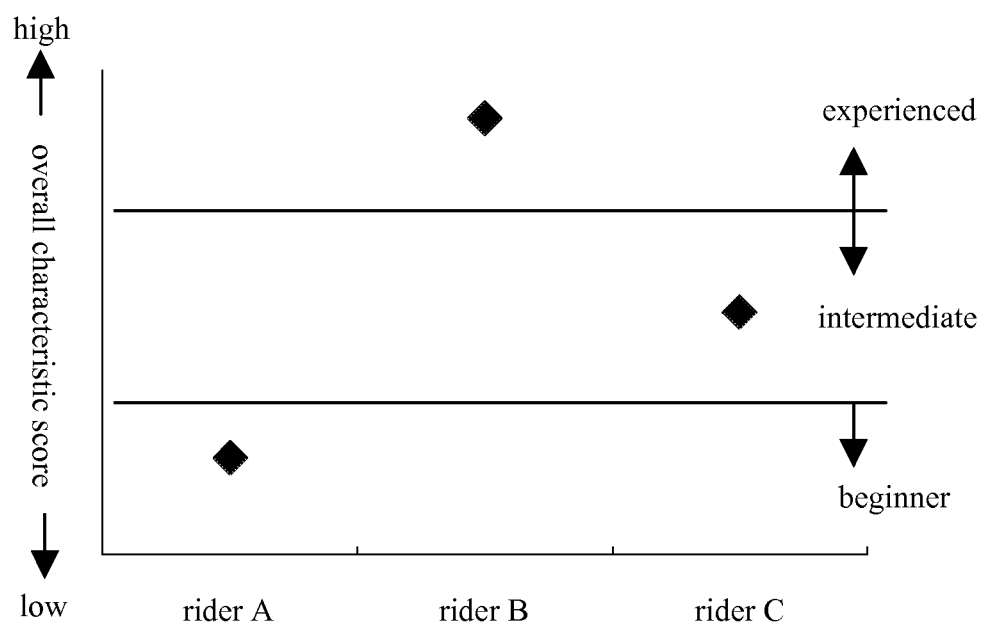
FIG. 17 is a view showing overall characteristic scores of different riders according to a preferred embodiment of the present invention.

Since the overall characteristic score G is a continuous value, the rider's overall characteristics can be determined in a single stage using this overall characteristic score G. The overall characteristic score G determines the rider's characteristics in a comprehensive way based on at least two or more of the rider's vehicle stability characteristic, turning characteristic, and head stability characteristic. As shown in FIG. 17, thresholds can be provided for the overall characteristic score G to determine the overall characteristics in stages. FIG. 17 is a view showing overall characteristic scores determined in stages for different riders.

The characteristic classifying unit 58 classifies the rider's characteristics based on at least two or more of the results determined by the vehicle stability characteristic determining unit 54, turning characteristic determining unit 55, and head stability characteristic determining unit 56. Reference is made to FIG. 18 for an example of characteristic classification. FIG. 18 is a characteristic classification table classifying into three stages each of the vehicle stability score $S_v$, turning performance score $T_v$, and head stability score H. The characteristics classified are displayed on the monitor 41, and the riders can confirm their own classified characteristics.

The database unit 59 successively stores, for each curve for which a turning movement has been determined, determination results determined by the vehicle stability characteristic determining unit 54, turning characteristic determining unit 55, head stability characteristic determining unit 56 and overall characteristic determining unit 57, and the vehicle stability score $S_v$, turning performance score $T_v$, head stability score H and overall characteristic score G. That is, the characteristic results of each of the past and present riders are accumulated in the database unit 59. Each of these accumulated characteristic results is sent to the characteristic transition calculating unit 60.

Figure 19:
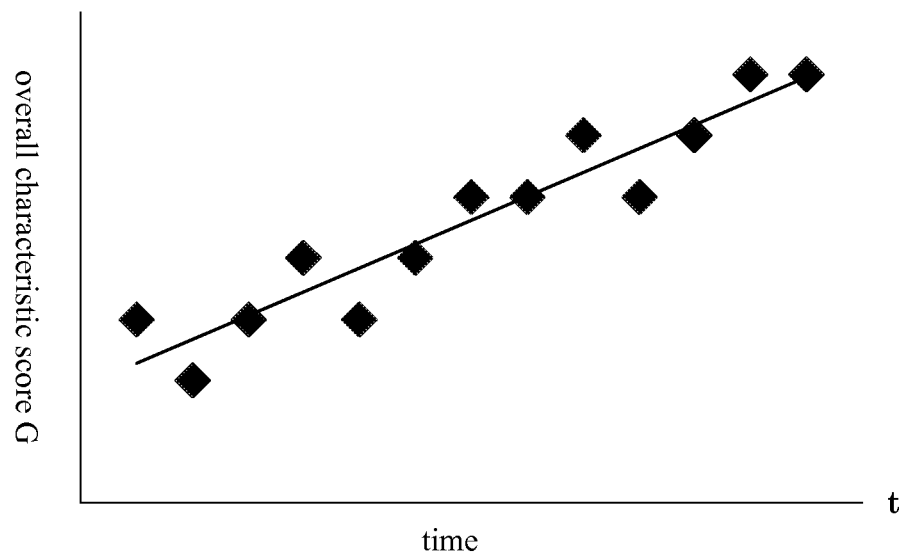
FIG. 19 is a graph of calculating characteristic transitions according to a preferred embodiment of the present invention.

The characteristic transition calculating unit 60 calculates a transition of each of the vehicle stability score $S_v$, turning performance score $T_v$, head stability score H and overall characteristic score G. The transition of the overall characteristic score G will be described here. As shown in FIG. 19, a linear regression equation by the least square method shown in the following equation (7) is calculated, with overall characteristic scores G included in a fixed time from the past to the present and stored in the database unit 59 being dependent variables, and a unit time t being an independent variable. FIG. 19 is a graph of characteristic transition calculations. From this, a regression coefficient k for the unit time t is calculated. The size of this regression coefficient k shows the rider's level of progress. However, the significance of regression is verified with 5% significance level by carrying out an analysis of variance (ANOVA) of regression for the regression expression. When regression is not significant, the value of k is set to 0.

$$G = k \cdot t + a \tag{7}$$

Figure 20:
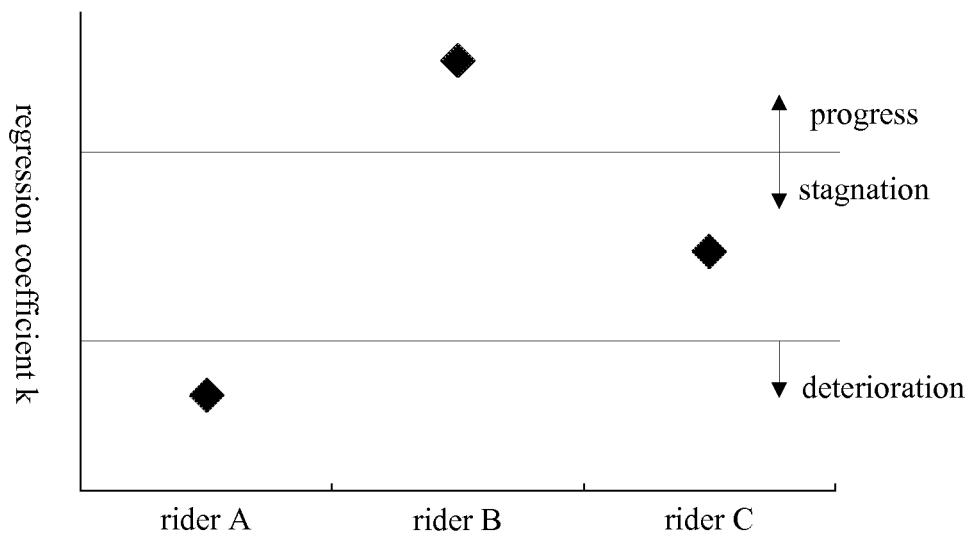
FIG. 20 is an explanatory view showing progress levels of riders according to a preferred embodiment of the present invention.

The progress level classifying unit 61 determines a level of progress of the rider's characteristics by classifying values of regression coefficient k by predetermined thresholds as shown in FIG. 20. That is, whether the rider's control characteristics have improved, stagnated or deteriorated can be determined by comparing the values of regression coefficient k with the thresholds. FIG. 20 is an explanatory view showing the riders' levels of progress. The level of progress can also be determined for each rider. Similarly, the level of progress of the rider's characteristics in each score can be determined also for the vehicle stability score $S_v$, turning performance score $T_v$, and head stability score H. Since the determined levels of progress are displayed on the monitor 41, respectively, the riders can know transitions of their characteristics whenever turning curves.

Figure 21:
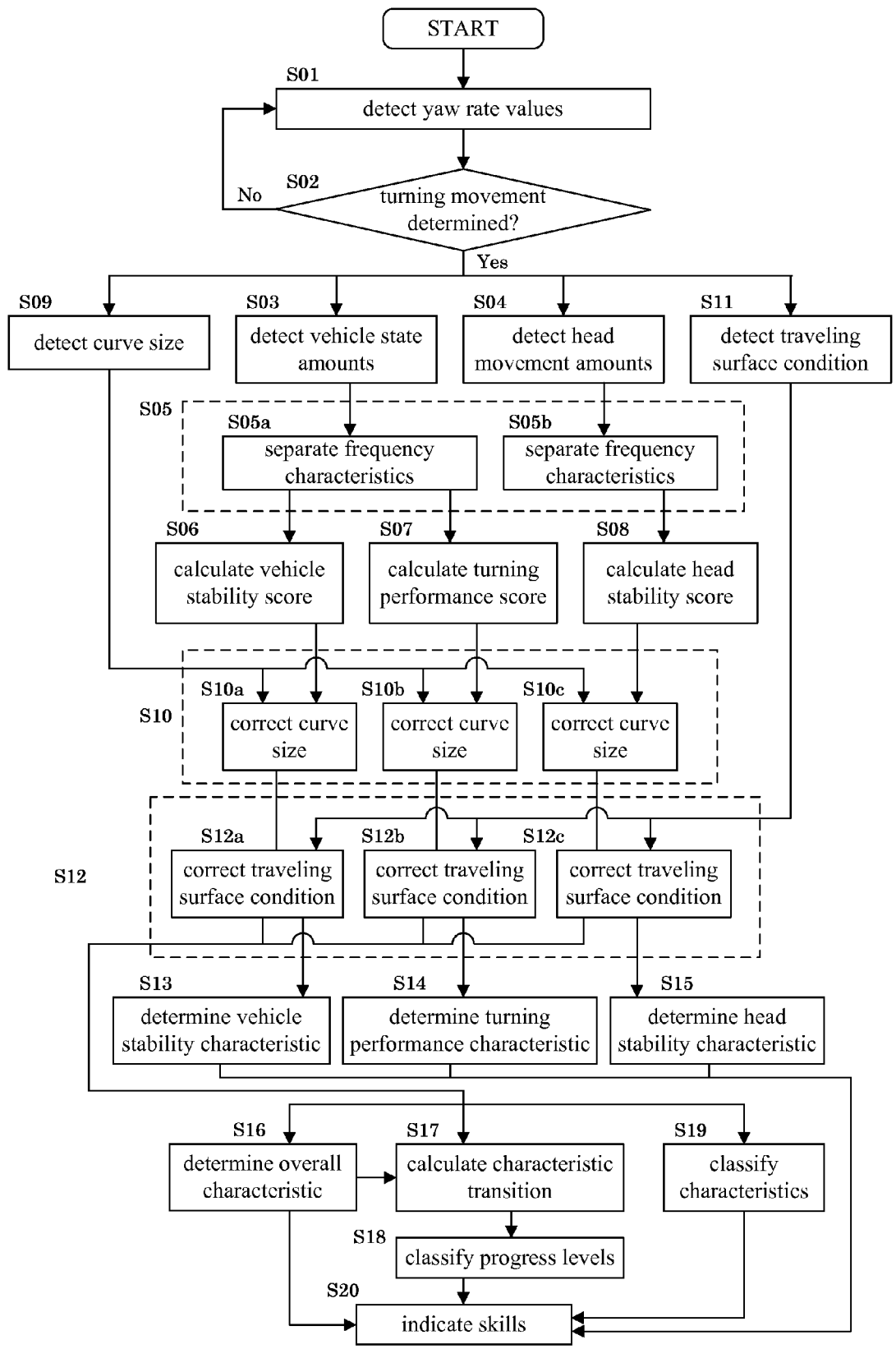
FIG. 21 is a flow chart of the characteristic determination according to a preferred embodiment of the present invention.

Next, a control operation of the determination controller 32 will be described with reference to FIG. 21. FIG. 21 is a flow chart of characteristic determination.

The turning movement discriminating unit 52 acquires the yaw rate of the two-wheeled motor vehicle 1 detected by the gyroscope 33 when the rider turns the key on (S01). Next, the turning movement discriminating unit 52 determines whether the two-wheeled motor vehicle 1 has made a turning movement (S02). When the two-wheeled motor vehicle 1 is not determined to have made a turning movement, detection values of the yaw rate continue to be taken in. When the two-wheeled motor vehicle 1 is determined to have made a turning movement, the vehicle state amounts are taken into the component separating unit 53 from the memory 51 (S03). When the two-wheeled motor vehicle 1 is determined to have made a turning movement, the head movement amounts also are taken into the component separating unit 53 from the memory 51 (S04). Next, the vehicle state amounts and the head movement amounts are filtered, respectively, and the frequency characteristics are separated (S05). That is, the vehicle state amounts inputted to the component separating unit 53 have the frequency characteristics separated into the low-frequency band components and high-frequency band components by the low pass filter 65 and bandpass filter 66 (S05a). The head movement amounts also have the frequency characteristics separated into the low-frequency band components and high-frequency band components by the low pass filter 65 and bandpass filter 66 (S05b).

The vehicle stability score calculating unit 75 calculates a vehicle stability score $S_v$ based on the vehicle state amounts having been filtered (S06). The turning performance score calculating unit 81 calculates a turning performance score $T_v$ based on the vehicle state amounts having been filtered (S07). The head stability score calculating unit 87 calculates a head stability score H based on the head movement amounts having been filtered (S08).

In parallel with steps S03-S08, when the two-wheeled motor vehicle 1 is determined by the turning movement discriminating unit 52 to have made a turning movement, the curve size estimated by the curve size estimating unit 43 and stored in the memory 51 is inputted to the curve size correcting units 76, 82 and 88 (S09). Next, each of the scores is corrected based on the curve size estimated (S10). That is, the curve size correcting unit 76 corrects the vehicle stability score $S_v$ based on the curve size estimated (S10a). The curve size correcting unit 82 corrects the turning performance score $T_v$ based on the curve size estimated (S10b). The curve size correcting unit 88 corrects the head stability score H based on the curve size estimated (S10c).

In parallel with steps S03-S10, when the two-wheeled motor vehicle 1 is determined by the turning movement discriminating unit 52 to have made a turning movement, the traveling surface condition in the turning section estimated by the traveling surface condition estimating unit 47 and stored in the memory 51 is inputted to the traveling surface condition correcting units 77, 83 and 89 (S11). Next, each of the scores is corrected based on the traveling surface condition estimated (S12). That is, the traveling surface condition correcting unit 77 corrects the vehicle stability score $S_v$ after the curve size correction, based on the traveling surface condition estimated (S12a). The traveling surface condition correcting unit 83 corrects the turning performance score $T_v$ after the curve size correction, based on the traveling surface condition estimated (S12b). The traveling surface condition correcting unit 89 corrects the head stability score H after the curve size correction, based on the traveling surface condition estimated (S12c).

The vehicle stability score comparing unit 78 determines a vehicle stability characteristic based on the vehicle stability score $S_v$ corrected according to the curve size and traveling surface condition (S13). The turning performance score comparing unit 84 determines a turning characteristic based on the turning performance score $T_v$ corrected according to the curve size and traveling surface condition (S14). The head stability score comparing unit 90 determines a head stability characteristic based on the head stability score H corrected according to the curve size and traveling surface condition (S15).

The overall characteristic determining unit 57 calculates a score G and determines an overall characteristic, based on at least two or more of the vehicle stability score $S_v$, turning performance score $T_v$ and head stability score H corrected according to the curve size and traveling surface condition (S16). In parallel with step S16, the characteristic transition calculating unit 60 calculates each characteristic transition based on the overall score G or each score transition of the vehicle stability score $S_v$, turning performance score $T_v$ and head stability score H corrected according to the curve size and traveling surface condition (S17). The progress level classifying unit 67 classifies the rider's level of progress based on each characteristic transition (S18). In parallel with step S16-step S18, the characteristic classifying unit 58 classifies the rider's characteristics based on the vehicle stability score $S_v$, turning performance score $T_v$ and head stability score H corrected according to the curve size and traveling surface condition (S19). Each of the vehicle stability characteristic, turning characteristic, head stability characteristic, overall characteristic, progress level classification and characteristic classification is presented to the rider by the monitor 41 (S20).

According to the present preferred embodiment of the present invention, as described above, the rider's control characteristics can be determined for each curve where the two-wheeled motor vehicle 1 is discriminated to have made a turning movement by the turning movement discriminating unit 52. The rider's control characteristics can be determined from various aspects and with high accuracy. Further, since the rider himself can refer to the determined results, the rider can grasp his own characteristics expressed numerically. Consequently, the rider can easily and accurately determine deficiencies in his own control characteristics. An inexperienced rider can have an enhanced motivation to improve his control characteristics for the two-wheeled motor vehicle.

With the two-wheeled motor vehicle 1, since the rider's control characteristics can be determined from various aspects and with high accuracy, this is applicable to education for improvement in the skills of the rider. In this case, an educational effect can be grasped quantitatively. Thus, the rider's education can be conducted efficiently.

The present invention is not limited to the foregoing preferred embodiment, but may be modified in accordance with the following description.

An eyeball movement sensor may be used instead of the gyroscope 38 provided for the helmet 37. With the eyeball movement sensor detecting the rider's eyeball movement, the rider's head movement in the pitch direction can be detected. There are eyeball movement sensors of the type provided for the helmet 37, and the type provided for goggles.

The gyroscope 23 need not be the triaxial sensor, but may be replaced with a plurality of uniaxial sensors. That is, each of the rates and angles in the yaw direction, roll direction and pitch direction may be detected with a single gyroscope.

Although the determination controller 32 preferably is provided separately from the ECU 25 in the foregoing preferred embodiment, the determination controller 32 may be incorporated into the ECU 25.

In the foregoing preferred embodiment, the vehicle stability score $S_v$ preferably is calculated as a weighted linear sum of each stability index of the yaw rate, roll rate and pitch rate, but it may be calculated by weighting only the stability index of the yaw rate. The running characteristics of the saddle riding type vehicle can be reflected better by calculating the vehicle stability score $S_v$ based on the stability indexes of not only the yaw rate but also the roll rate or pitch rate, or both.

In the foregoing preferred embodiment, the characteristic results preferably are displayed on the monitor 41 for presentation to the rider. Instead of being limited to this, they may be presented to the rider by other methods. For example, a speaker may be provided inside the helmet 37 to inform the rider of the characteristic results by sound. A vibrator may be mounted in the seat 16 to present the rider with the characteristic results by vibration. Thus, the information may be provided not only visually, but to at least one of the sensory organs of hearing and touch.

In the foregoing preferred embodiment, a curve size run by the two-wheeled motor vehicle 1 is estimated, and various scores are corrected according to the estimated curve size. When running a course whose curve size is known, such as when running a predetermined course, the curve size may be stored in the memory 51 beforehand.

In the foregoing preferred embodiment, a traveling surface condition run by the two-wheeled motor vehicle 1 is estimated, and various scores are corrected according to the estimated traveling surface condition. The traveling surface coefficient of friction μ reflecting traveling surface conditions may be stored in the memory 51 beforehand, so that the rider may select a traveling surface condition directly.

Figure 22:
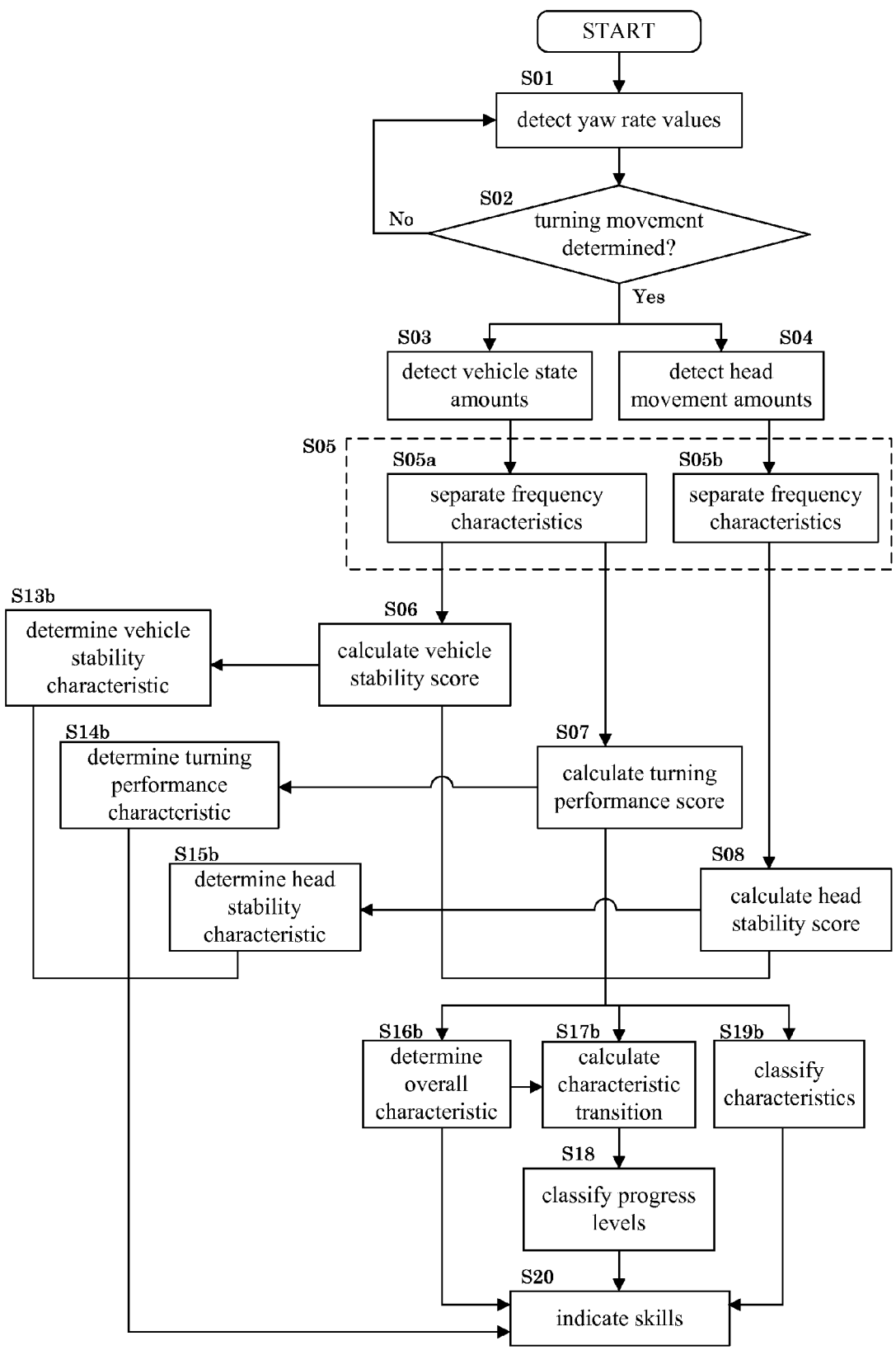
FIG. 22 is a flow chart of a characteristic determination according to a modification of a preferred embodiment of the present invention.

In the foregoing preferred embodiment, the curve size correction and traveling surface condition correction are carried out preferably based on the vehicle stability score, turning performance score, and head stability score calculated. As shown in FIG. 22, the curve size correction and traveling surface condition correction may be omitted. In the case of FIG. 22, the vehicle stability score comparing unit 78 determines a vehicle stability characteristic based on the vehicle stability score $S_v$ (S13b). The turning performance score comparing unit 84 determines a turning characteristic based on the turning performance score $T_v$ (S14b). The head stability score comparing unit 90 determines a head stability characteristic (S15b).

The overall characteristic determining unit 57 calculates an overall score G and determines an overall characteristic based on at least two or more of the vehicle stability score $S_v$, turning performance score $T_v$ and head stability score H (S16b). The characteristic transition calculating unit 60 calculates each characteristic transition based on the overall score G or each score transition of the vehicle stability score $S_v$, turning performance score $T_v$ and head stability score H (S17b). The characteristic classifying unit 58 classifies the rider's characteristics based on the vehicle stability score $S_v$, turning performance score $T_v$ and head stability score H.

Figure 23:
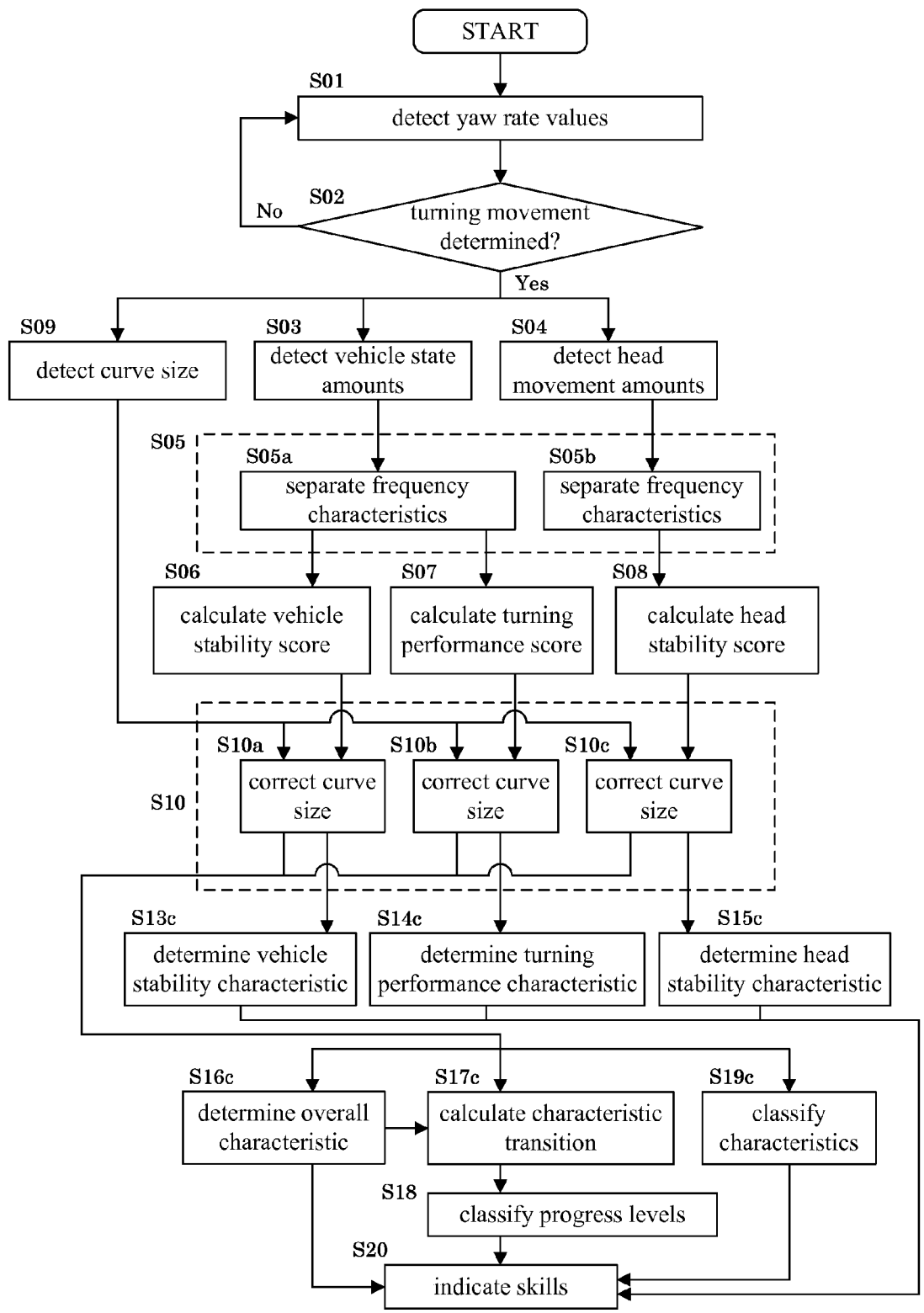
FIG. 23 is a flow chart of a characteristic determination according to a modification of a preferred embodiment of the present invention.

As another modification, as shown in FIG. 23, only the curve size correction may be carried out on each of the calculated vehicle stability score $S_v$, turning performance score $T_v$ and head stability score H. Only the traveling surface condition correction may be carried out as shown in FIG. 24.

According to FIG. 23, the vehicle stability score comparing unit 78 determines a vehicle stability characteristic based on the vehicle stability score $S_v$ corrected according to the curve size (S13c). The turning performance score comparing unit 84 determines a turning characteristic based on the turning performance score $T_v$ corrected according to the curve size (S14c). The head stability score comparing unit 90 determines a head stability characteristics based on the head stability score H corrected according to the curve size (S15d).

The overall characteristic determining unit 57 determines an overall characteristic, based on at least two or more of the vehicle stability score $S_v$, turning performance score $T_v$ and head stability score H corrected according to the curve size (S16c). The characteristic transition calculating unit 60 calculates each characteristic transition based on the overall score G or each score transition of the vehicle stability score $S_v$, turning performance score $T_v$ and head stability score H after the curve correction (S17c). The characteristic classifying unit 58 classifies the rider's characteristics based on the vehicle stability score $S_v$, turning performance score $T_v$ and head stability score H corrected according to the curve size (S19c).

Figure 24:
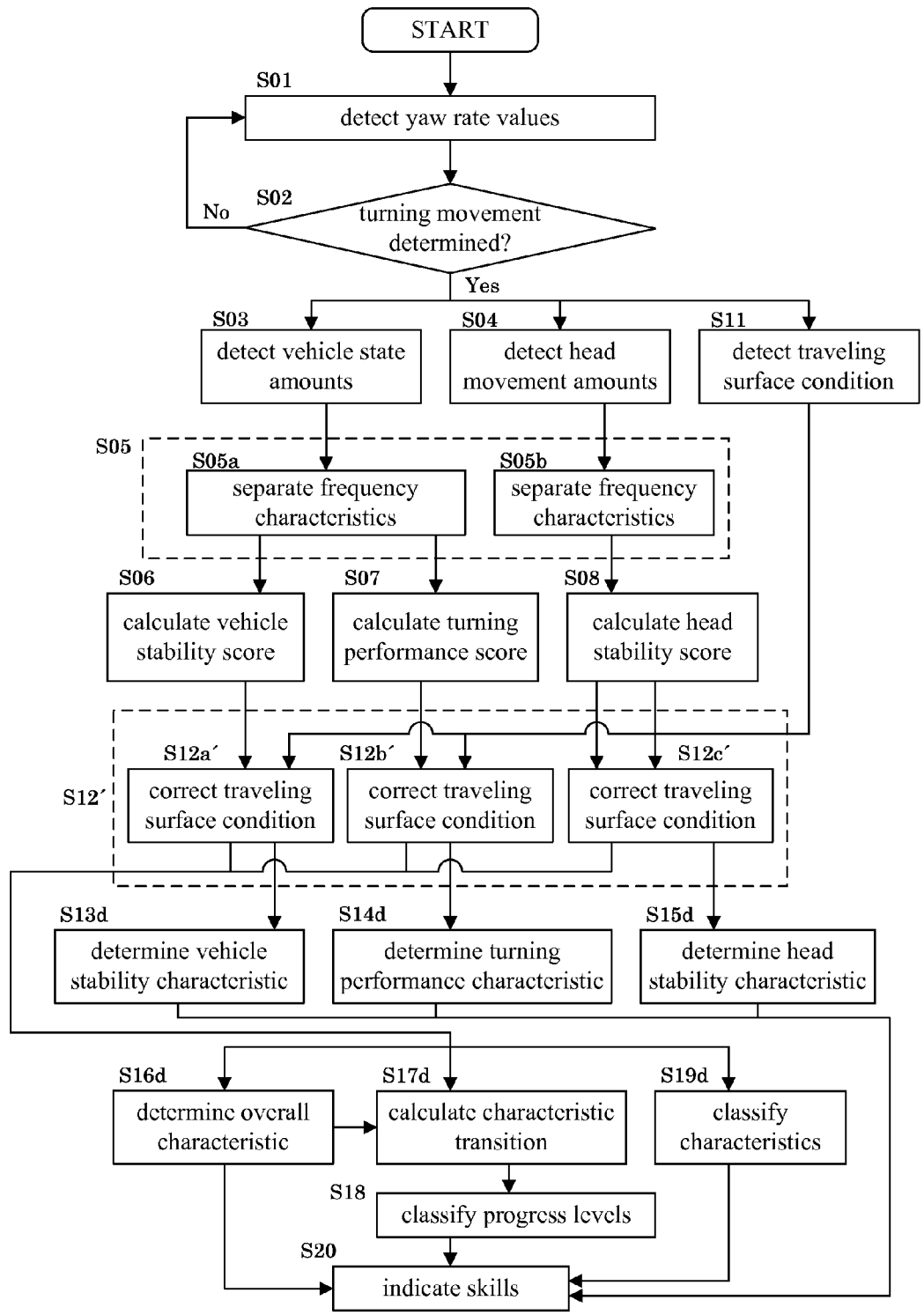
FIG. 24 is a flow chart of a characteristic determination according to a modification of a preferred embodiment of the present invention.

According to FIG. 24, in parallel with steps S03-S04, when the two-wheeled motor vehicle 1 is determined by the turning movement discriminating unit 52 to have made a turning movement, the traveling surface condition in the turning section estimated by the traveling surface condition estimating unit 47 and stored in the memory 51 is inputted to the traveling surface condition correcting unit 59 (S11). Next, each of the scores is corrected based on the traveling surface condition estimated (S12'). That is, the traveling surface condition correcting unit 77 corrects the vehicle stability score $S_v$ based on the traveling surface condition estimated (S12a'). The traveling surface condition correcting unit 83 corrects the turning performance score $T_v$ based on the traveling surface condition estimated (S12b'). The traveling surface condition correcting unit 89 corrects the head stability score H based on the traveling surface condition estimated (S12c').

The vehicle stability score comparing unit 78 determines a vehicle stability characteristic based on the vehicle stability score $S_v$ corrected according to the traveling surface condition (S13d). The turning performance score comparing unit 84 determines a turning characteristic based on the turning performance score $T_v$ corrected according to the traveling surface condition (S14d). The head stability score comparing unit 90 determines a head stability characteristics based on the head stability score H corrected according to the traveling surface condition (S15d).

The overall characteristic determining unit 57 determines an overall characteristic, based on at least two or more of the vehicle stability score $S_v$, turning performance score $T_v$ and head stability score H corrected according to the traveling surface condition (S16d). The characteristic transition calculating unit 60 calculates each characteristic transition based on the overall score G or each score transition of the vehicle stability score $S_v$, turning performance score $T_v$ and head stability score H corrected according to the traveling surface condition (S17d). The progress level classifying unit 67 classifies the rider's level of progress based on each characteristic transition (S18d). The characteristic classifying unit 58 classifies the rider's characteristics based on the vehicle stability score $S_v$/turning performance score $T_v$ and head stability score H corrected according to the traveling surface condition (S19d).

Figure 25:
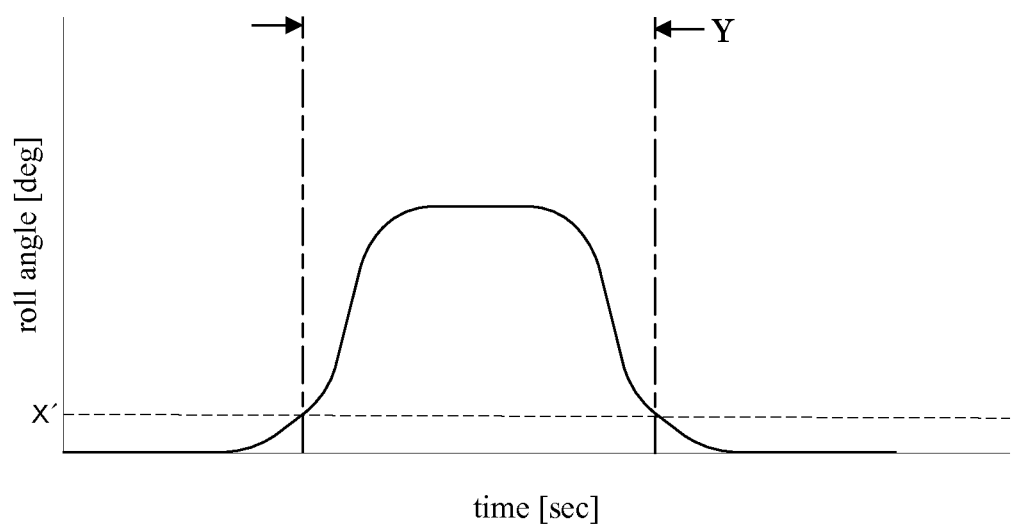
FIG. 25 is a graph illustrating a turning movement determination according to a modification of a preferred embodiment of the present invention.

In the foregoing preferred embodiment, the yaw rate or yaw angle is preferably used to discriminate a turning section Y. Instead, the roll rate, roll angle, steering angle or GPS track may be used. When using the roll angle, as shown in FIG. 25, the turning movement discriminating unit 52 discriminates a turning movement section Y from variations of the roll angle. That is, if a section is from a point of time when the absolute value of the roll angle of the two-wheeled motor vehicle 1 exceeds a threshold X' to a point of time when it falls below the threshold X' again, and the duration of the section is a minimum duration $Y'_{min}$, or longer, the turning movement discriminating unit 52 will discriminate the section to be a turning movement section Y. If the section from the point of time when the absolute value of the roll angle of the two-wheeled motor vehicle 1 exceeds the threshold X' to the point of time when it falls below the threshold X' again is less than the minimum duration $Y'_{min}$, the turning movement discriminating unit 52 will not discriminate the section to be a turning movement section. The value of the threshold X' may be set as appropriate according to the type of the two-wheeled motor vehicle 1.

When using the steering angle, the discrimination of a turning movement section can be made as in the case of the roll angle. When using the roll rate, a turning movement section Y can be discriminated after converting rate data into roll angle data such as by time integration.

Figure 26:
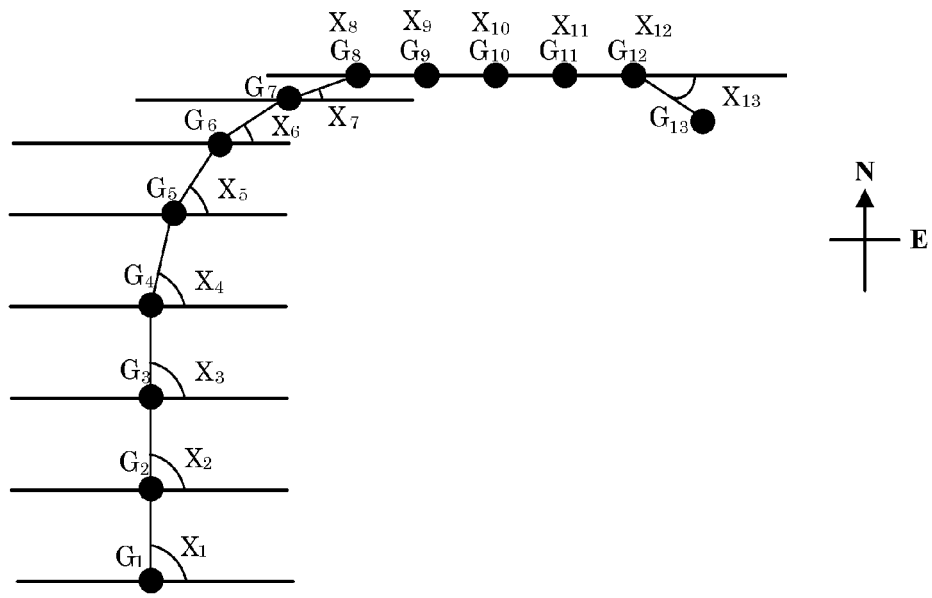
FIG. 26 is an explanatory view illustrating a turning movement determination by a GPS track according to a modification of a preferred embodiment of the present invention.
Figure 27:
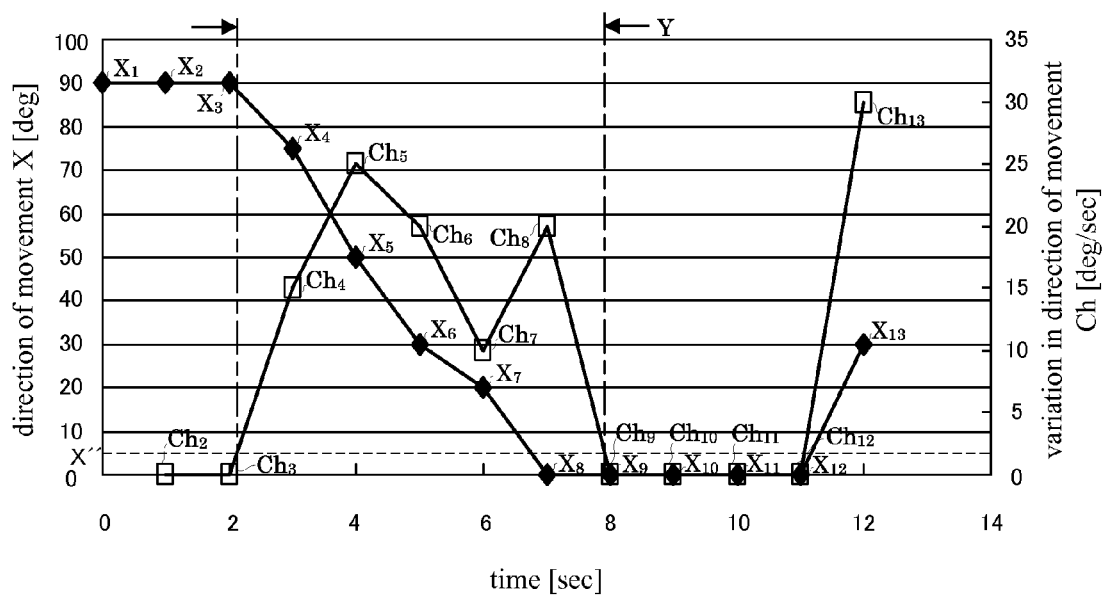
FIG. 27 is a graph illustrating the turning movement determination by the GPS track according to a modification of a preferred embodiment of the present invention.

The discrimination of a turning movement section Y using GPS will be described with reference to FIGS. 2, 26 and 27. FIG. 26 is an explanatory view showing a GPS track when the two-wheeled motor vehicle 1 makes a turning movement. FIG. 27 is a graph showing a direction of movement and variations in the direction of movement of the two-wheeled motor vehicle 1. When using a running track of the two-wheeled motor vehicle 1 by GPS, a direction of movement of the two-wheeled motor vehicle 1 is calculated using GPS data at a certain time and GPS data obtained before. A turning movement section can be discriminated using variations in the direction of movement as when the yaw rate is used.

As shown in FIG. 26, a direction of movement of the two-wheeled motor vehicle 1 is defined from running intervals of the two-wheeled motor vehicle 1 in time intervals set beforehand by an angle between a running track of the two-wheeled motor vehicle 1 in each running track and a latitude line. In FIG. 26, the upward direction is regarded as northward. In FIG. 26, the time interval set beforehand is one second. This time interval can be set arbitrarily. GPS data $G_1$-$G_{13}$ show positions at the time intervals of the two-wheeled motor vehicle 1 set beforehand. Angle $X_n$ formed between a line linking each GPS data $G_n$ and $G_{n+1}$ and a line segment horizontal to the latitude lines is defined as a direction of movement of the two-wheeled motor vehicle 1. The GPS data $G_1$-$G_{13}$ are $X_1$-$X_3$=90°, $X_4$=75°, $X_8$=50°, $X_6$=30°, $X_7$=20°, $X_8$-$X_{12}$=0°, and $X_{13}$=30°, for example.

When a turning movement section is discriminated using GPS, the movement variation calculating unit 62 calculates an absolute value $Ch_n = |X_n - K_{n-1}|$ of a variation in the direction of movement of the two-wheeled motor vehicle 1 based on GPS data $G_n$ inputted from the GPS 44. The turning movement discriminating unit 52 discriminates a turning movement section Y from the variation $Ch_n$ in the direction of movement. That is, if a section is from a point of time when the variation in the direction of movement of the two-wheeled motor vehicle 1 exceeds a threshold X" to a point of time when it falls below the threshold X" again, and the duration of the section is a minimum duration $Y"_{min}$ or longer, the turning movement discriminating unit 52 will discriminate the section to be a turning movement section Y. If the section from the point of time when the variation in the direction of movement of the two-wheeled motor vehicle 1 exceeds the threshold X" to the point of time when it falls below the threshold X" again is less than the minimum duration $Y"_{min}$, the turning movement discriminating unit 52 will not discriminate the section to be a turning movement section. The value of the threshold X" may be set as appropriate according to the type of the two-wheeled motor vehicle 1.

Figure 28:
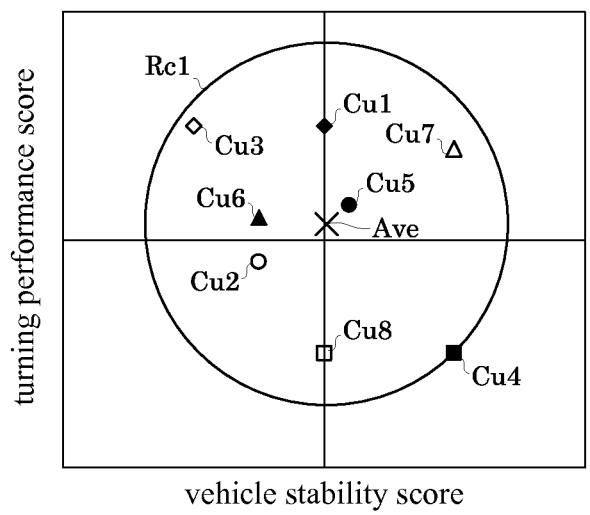
FIG. 28 is a distribution map showing a characteristic transition according to a modification of a preferred embodiment of the present invention.
Figure 29:
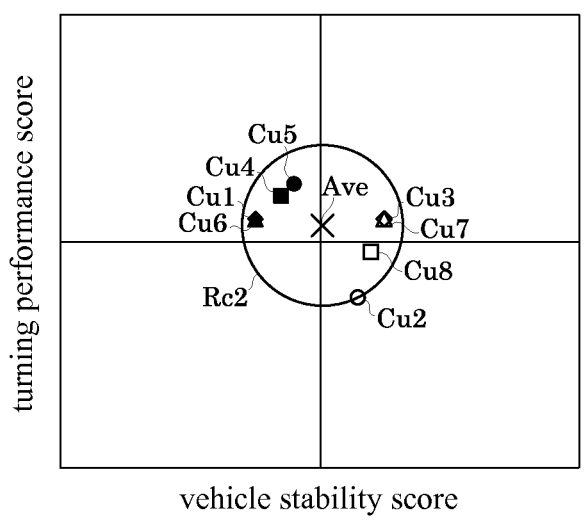
FIG. 29 is a distribution map showing a characteristic transition according to a modification of a preferred embodiment of the present invention.

In the foregoing preferred embodiment, the characteristic transition calculating unit 60 calculates a regression coefficient k using a linear regression equation by the least square method to obtain a transition of each score and indicate the rider's level of progress. Instead, each score may be indicated visually by allotting the vehicle stability score, turning performance score, and head stability score to the x-axis, y-axis and z-axis of a 3D rectangular coordinate system. Each score of the rider shown in coordinate space with the vehicle stability score allotted to the x-axis and the turning performance score to the y-axis, for example, will be described with reference to FIGS. 28 and 29. FIGS. 28 and 29 are distribution maps of the vehicle stability score and the turning performance score in each turning section of the same rider shown on two-dimensional coordinate systems, respectively.

If each score of each turning section of eight turning sections Cu1-Cu8 is displayed as shown in FIGS. 28 and 29, for example, even when average scores Ave of the turns are the same, by looking at variations of the plotting in coordinate space, it can be determined whether the rider can turn similarly each time or the characteristic varies to lack in stability for each turn. The average scores Ave in the eight turning sections Cu1-Cu8 of the vehicle stability scores and the turning performance scores are the same in FIG. 28 and FIG. 29. However, the variations in the plotted scores are larger in FIG. 28 than in FIG. 29. FIGS. 28 and 29 show circles Rc1 and Rc2 passing through the plots of the turning sections farthest from the average scores Ave as rough indications of the variations plotted. Instead of being limited to this, indications may be given using standard deviations of the plotting points and the average scores Ave of the respective turning sections.

Thus, by indicating the transition of each score, even when the average scores of the turns are similar, by looking at variations of the plotting in coordinate space, it can be determined whether the rider can turn similarly each time or the characteristic varies to lack in stability for each turn.

Figure 30:
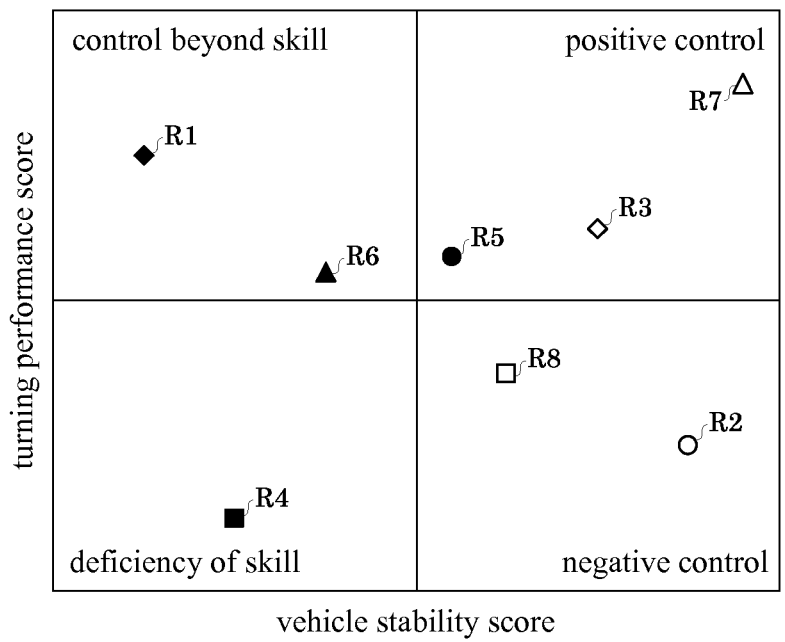
FIG. 30 is a distribution map showing a characteristic transition according to a modification of a preferred embodiment of the present invention.

Moreover, characteristics of a plurality of riders may be indicated using one two-wheeled motor vehicle 1. FIG. 30 is a distribution map of each average score of a plurality of riders' vehicle stability scores and turning performance scores on a two-dimensional coordinate system. By classifying each score of the plurality of riders into a number categories in coordinate space, relative positioning of each rider's control skills becomes clear, and points for improvement and points of instruction can be clarified. In FIG. 30, as one example, the coordinate space is divided into four categories of "positive control", "negative control", "control beyond skill" and "deficiency of skill", and the scores of eight riders R1-R8 are plotted.

Rider R1 included in the "control beyond skill" category here has a relatively low vehicle stability score and high turning performance score. Such a rider takes a positive control action in order to bring out the turning performance of the vehicle, but on the other hand, can be determined that he fails to control the vehicle safely. Consequently, what is necessary is to teach such a rider a vehicle control method for improving stability.

Rider R2 included in the "negative control" category has a relatively high vehicle stability score and low turning performance score. Such a rider provides a stable vehicle behavior, but can be determined to be sacrificing turning performance by suppressing the roll angle of the vehicle, reducing turning speed and so on. What is necessary is to teach such a rider a vehicle control method for bringing out turning performance.

Thus, by plotting vehicle stability scores, turning performance scores and head stability score in two-dimensional space or three-dimensional space, and presenting the riders or running instructors with the information on the monitor 41, positioning and characteristics of the riders' control skills can be grasped easily and intuitively, thereby to clarify points for improvement and points of instruction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A rider characteristic determining apparatus for determining control characteristics of a rider controlling a saddle riding type vehicle, the rider characteristic determining apparatus comprising: a first vehicle state detector that detects at least one of a yaw rate and a yaw angle of the saddle riding type vehicle; a turning movement discriminating unit that discriminates a section where the saddle riding type vehicle has made a turning movement; a second vehicle state detector that detects at least one of a roll rate, a roll angle, a pitch rate, a pitch angle, and a caster angle of the saddle riding type vehicle; a component separating unit that separates detection values detected by the first vehicle state detector and the second vehicle state detector in the turning movement section discriminated by the turning movement discriminating unit, into adjustment components that are high-frequency band components higher than a threshold frequency set beforehand, and prediction components that are low-frequency band components lower than the threshold frequency; a vehicle stability characteristic determining unit that determines a vehicle stability characteristic of the saddle riding type vehicle; and a turning characteristic determining unit that determines a turning characteristic of the saddle riding type vehicle; wherein the vehicle stability characteristic determining unit includes a vehicle stability score calculating unit that calculates a vehicle stability score of the saddle riding type vehicle based on a ratio between the adjustment components and the prediction components separated from the detection value of the first vehicle state detector by the component separating unit; and the turning characteristic determining unit includes a turning performance score calculating unit that calculates a turning performance score of the saddle riding type vehicle based on the prediction components separated from the detection value of the second vehicle state detector by the component separating unit.

2. The rider characteristic determining apparatus according to claim 1, wherein the turning movement discriminating unit discriminates the section where the saddle riding type vehicle has made the turning movement based on at least one of the yaw rate, the yaw angle, the roll rate, the roll angle, a steering angle, and a GPS track.

3. The rider characteristic determining apparatus according to claim 1, wherein: the vehicle stability characteristic determining unit includes a vehicle stability score comparing unit that determines the vehicle stability characteristic by comparing the vehicle stability score with a criterion value of the vehicle stability characteristic; and the turning characteristic determining unit includes a turning performance score comparing unit that determines the turning characteristic by comparing the turning performance score with a criterion value of the turning characteristic.

4. The rider characteristic determining apparatus according to claim 1, wherein the vehicle stability score calculating unit calculates the vehicle stability score based on a ratio between the adjustment components and the prediction components separated from the detection values of the first vehicle state detector and the second vehicle state detector by the component separating unit.

5. The rider characteristic determining apparatus according to claim 1, further comprising a steering angle sensor that detects a steering angle; wherein the component separating unit separates into the adjustment components and the prediction components a detection value detected by the steering angle sensor in the turning movement section discriminated by the turning movement discriminating unit; and the turning performance score calculating unit calculates the turning performance score based on the prediction components separated from the detection values of the second vehicle state detector and the steering angle sensor by the component separating unit.

6. The rider characteristic determining apparatus according to claim 1, further comprising a vehicle speed sensor that detects a vehicle speed of the saddle riding type vehicle; wherein the turning performance score calculating unit calculates the turning performance score based on the prediction components separated from the detection value of the second vehicle state detector by the component separating unit and the vehicle speed detected by the vehicle speed sensor.

7. The rider characteristic determining apparatus according to claim 1, further comprising a curve size estimating unit that estimates a curvature size of a curve run by the saddle riding type vehicle; wherein the vehicle stability characteristic determining unit includes a first curve size correcting unit that corrects the vehicle stability score according to the curvature size of the curve; and the turning characteristic determining unit includes a second curve size correcting unit that corrects the turning performance score according to the curvature size of the curve.

8. The rider characteristic determining apparatus according to claim 1, further comprising a traveling surface condition estimating unit that estimates a traveling surface condition run by the saddle riding type vehicle; wherein the vehicle stability characteristic determining unit includes a first traveling surface condition correcting unit that corrects the vehicle stability score according to the traveling surface condition estimate; and the turning characteristic determining unit includes a second traveling surface condition correcting unit that corrects the turning performance score according to the traveling surface condition estimate.

9. The rider characteristic determining apparatus according to claim 1, further comprising an overall characteristic determining unit that determines the rider's comprehensive overall characteristics based on the vehicle stability score and the vehicle turning performance score.

10. The rider characteristic determining apparatus according to claim 1, further comprising: a database that accumulates past and present vehicle stability scores and turning performance scores; and a characteristic transition calculating unit that calculates a transition of the rider's control characteristics using information in the database.

11. The rider characteristic determining apparatus according to claim 1, further comprising a characteristic classifying unit that classifies the rider's control characteristics into one of a plurality of categories based on the vehicle stability score and the turning performance score.

12. The rider characteristic determining apparatus according to claim 1, further comprising: a rider movement detector that detects at least one of a pitch rate, a pitch angle, a yaw rate, and a yaw angle of the rider's head or eyeball; and a head stability characteristic determining unit that determines the rider's head stability characteristic; wherein the component separating unit separates a detection value detected by the rider movement detector in the turning movement section discriminated by the turning movement discriminating unit, into adjustment components and prediction components; and the head stability characteristic determining unit includes a head stability score calculating unit that calculates a head stability score of the rider based on a ratio between the adjustment components and the prediction components separated from the detection value of the rider movement detector by the component separating unit.

13. The rider characteristic determining apparatus according to claim 12, wherein the head stability characteristic determining unit includes a head stability score comparing unit that compares the head stability score with a criterion value of the head stability characteristic to determine the head stability characteristic of the rider.

14. The rider characteristic determining apparatus according to claim 12, further comprising an overall characteristic determining unit that determines the rider's comprehensive overall characteristic based on at least two of the vehicle stability score, the vehicle turning performance score, and the head stability score.

15. The rider characteristic determining apparatus according to claim 12, further comprising: a database that accumulates past and present vehicle stability scores, turning performance scores, and head stability scores; and a characteristic transition calculating unit that derives a transition of the rider's control characteristics using information in the database.

16. The rider characteristic determining apparatus according to claim 12, further comprising a characteristic classifying unit that classifies the rider's control characteristics into one of a plurality of categories, based on at least two of the vehicle stability score, the turning performance score, and the head stability score.

17. A saddle riding type vehicle comprising:
- a rider characteristic determining apparatus for determining control characteristics of a rider controlling the saddle riding type vehicle, the rider characteristic determining apparatus including:
    - a first vehicle state detector that detects at least one of a yaw rate and a yaw angle of the saddle riding type vehicle;
    - a turning movement discriminating unit that discriminates a section where the saddle riding type vehicle has made a turning movement;
    - a second vehicle state detector that detects at least one of a roll rate, a roll angle, a pitch rate, a pitch angle, and a caster angle of the saddle riding type vehicle;
    - a component separating unit that separates detection values detected by the first vehicle state detector and the second vehicle state detector in the turning movement section discriminated by the turning movement discriminating unit, into adjustment components that are high-frequency band components higher than a threshold frequency set beforehand, and prediction components that are low-frequency band components lower than the threshold frequency;
    - a vehicle stability characteristic determining unit that determines a vehicle stability characteristic of the saddle riding type vehicle; and
    - a turning characteristic determining unit that determines a turning characteristic of the saddle riding type vehicle; wherein
  the vehicle stability characteristic determining unit includes a vehicle stability score calculating unit that calculates a vehicle stability score of the saddle riding type vehicle based on a ratio between the adjustment components and the prediction components separated from the detection value of the first vehicle state detector by the component separating unit; and
  the turning characteristic determining unit includes a turning performance score calculating unit that calculates a turning performance score of the saddle riding type vehicle based on the prediction components separated from the detection value of the second vehicle state detector by the component separating unit.

* * * * *